(12) United States Patent
Fraser et al.

(10) Patent No.: US 10,343,940 B1
(45) Date of Patent: Jul. 9, 2019

(54) SYSTEMS AND METHODS FOR TREATING INDUSTRIAL FEEDWATER

(71) Applicant: RI Holdings, LLC, Bethesda, MD (US)

(72) Inventors: Desmond A. Fraser, Herndon, VA (US); Hossein Ghaffari Nik, Fairfax, VA (US); Richard B. McMurray, Fairfax, VA (US); Akrem Hassen Adem Aberra, Fairfax, VA (US); Shelley Marie Grandy, Ashburn, VA (US); Patrick J. Hughes, Vienna, VA (US)

(73) Assignee: RI Holdings, LLC, Bethesda, MD (US)

(*) Notice: Subject to any disclaimer, the term of this patent is extended or adjusted under 35 U.S.C. 154(b) by 0 days.

(21) Appl. No.: 16/249,184

(22) Filed: Jan. 16, 2019

Related U.S. Application Data

(62) Division of application No. 15/926,965, filed on Mar. 20, 2018, now Pat. No. 10,183,881.

(51) Int. Cl.
  *C02F 1/76* (2006.01)
  *C02F 9/00* (2006.01)
  (Continued)

(52) U.S. Cl.
  CPC .................. *C02F 9/00* (2013.01); *C02F 1/30* (2013.01); *C02F 1/4606* (2013.01); *C02F 1/46104* (2013.01); *C02F 1/485* (2013.01); *C02F 1/722* (2013.01); *C02F 1/76* (2013.01); *C02F 1/78* (2013.01); *C02F 2201/483* (2013.01); *C02F 2303/04* (2013.01); *C02F 2303/22* (2013.01)

(58) Field of Classification Search
  CPC ...... C02F 1/50; C02F 1/46; C02F 1/78; C02F 1/484; C02F 1/4608; C02F 2201/46; C02F 2303/04; C02F 2303/08; C02F 2303/22
  See application file for complete search history.

(56) References Cited

U.S. PATENT DOCUMENTS

| 4,485,360 A | 11/1984 | Seward |
| 5,152,341 A | 10/1992 | Kasevich |

(Continued)

FOREIGN PATENT DOCUMENTS

| WO | WO 96/12677 | 5/1996 |
| WO | WO2007133634 | 11/2007 |

(Continued)

OTHER PUBLICATIONS http://www.dolphinwatercare.com/how-the-dolphin-system-works, Dolphin Watercare web site, "How it works: The Technology of Sustainable Water Treatment".

(Continued)

*Primary Examiner* — Walter D. Griffin
*Assistant Examiner* — Cameron J Allen
(74) *Attorney, Agent, or Firm* — Capitol Patent & Trademark Law Firm, PLLC

(57) ABSTRACT

Feedwater is treated using a combination of techniques, including the integration of a brine solution to promote the formation of reactive and molecular species in the feedwater with electrolytic ionization, the application of electromagnetic fields and the application of plasma fields. The integrated, combined techniques offer an improved treatment of scale forming ions, bacteria and biological contaminants in feedwater.

6 Claims, 19 Drawing Sheets

(51) Int. Cl.
 C02F 1/72 (2006.01)
 C02F 1/78 (2006.01)
 C02F 1/48 (2006.01)
 C02F 1/461 (2006.01)
 C02F 1/46 (2006.01)
 C02F 1/30 (2006.01)

(56) References Cited

U.S. PATENT DOCUMENTS

| | | |
|---|---|---|
| 5,173,169 A | 12/1992 | Garrison |
| 5,326,446 A | 7/1994 | Binger |
| 5,422,481 A | 6/1995 | Louvet |
| 5,568,121 A | 10/1996 | Lamensdorf |
| 5,598,572 A | 1/1997 | Tanikoshi |
| 5,606,723 A | 2/1997 | Morse |
| 5,667,677 A | 9/1997 | Stefanini |
| 5,738,766 A | 4/1998 | Jefferson |
| 5,792,343 A * | 8/1998 | Fujita ............... C02F 1/46104 137/101.25 |
| 6,063,267 A | 5/2000 | Crewson et al. |
| 6,267,933 B1 | 7/2001 | Thomason |
| 6,375,829 B1 | 4/2002 | Shevchenko et al. |
| 6,641,739 B2 | 11/2003 | Dresty et al. |
| 7,244,360 B2 | 7/2007 | Cho |
| 7,419,603 B2 | 9/2008 | Cho |
| 2001/0035342 A1 | 11/2001 | Morse |
| 2004/0141876 A1 | 7/2004 | Paskalov |
| 2005/0199484 A1 | 9/2005 | Olstowski |
| 2006/0175200 A1 | 8/2006 | Holland |
| 2006/0196817 A1 | 9/2006 | Crewson et al. |
| 2007/0051685 A1 | 3/2007 | Wittmer |
| 2007/0120563 A1 | 5/2007 | Kawabata et al. |
| 2008/0264800 A1 | 10/2008 | Schlager |
| 2009/0159461 A1 * | 6/2009 | McCutchen ......... B01D 9/0022 205/751 |
| 2009/0206974 A1 | 8/2009 | Meinke |
| 2010/0102003 A1 | 4/2010 | Holland |
| 2011/0240567 A1 | 10/2011 | Zolezzi-Garreton |
| 2011/0284231 A1 | 11/2011 | Becker |
| 2012/0217815 A1 | 8/2012 | Clark |
| 2013/0146464 A1 | 6/2013 | Shiga |
| 2013/0277045 A1 | 10/2013 | Parsche |
| 2014/0216936 A1 | 8/2014 | Hughes |
| 2014/0326681 A1 | 11/2014 | Denvir |
| 2014/0374236 A1 | 12/2014 | Moore et al. |
| 2015/0143918 A1 | 5/2015 | Schaefer et al. |
| 2016/0016829 A1 | 1/2016 | Hughe et al. |
| 2016/0251240 A1 | 9/2016 | Fraser et al. |

FOREIGN PATENT DOCUMENTS

| | | |
|---|---|---|
| WO | WO2008062171 | 5/2008 |
| WO | WO2011080679 | 7/2011 |

OTHER PUBLICATIONS

Cho et al., "Mitigation of Calcium-Carbonate Fouling Using RF Electric Fields", Proc. of Intl. Conf. on Heat Exchange Fouling and Cleaning VIII, pp. 384-391, Jun. 2009, Austria.

* cited by examiner

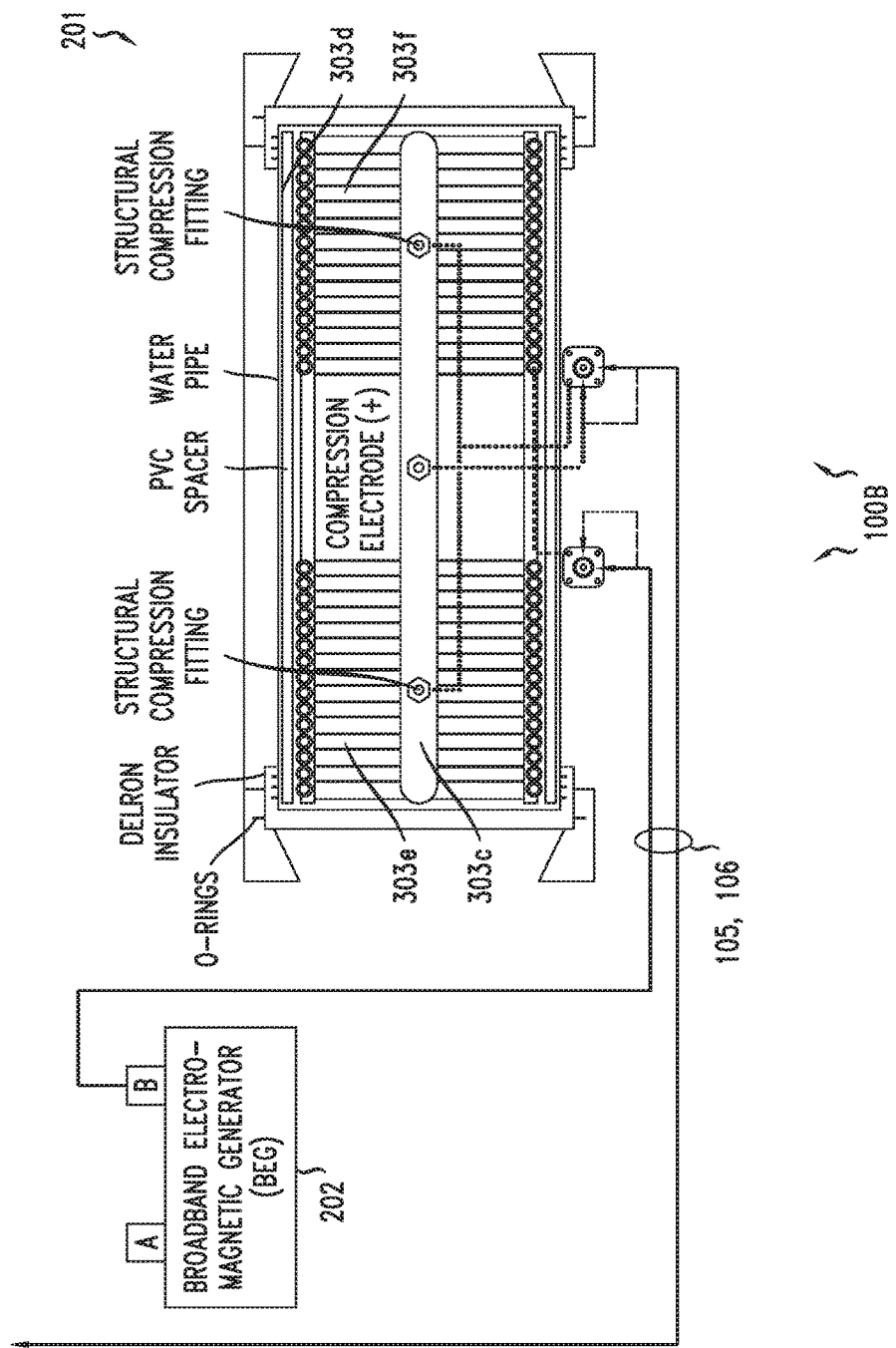

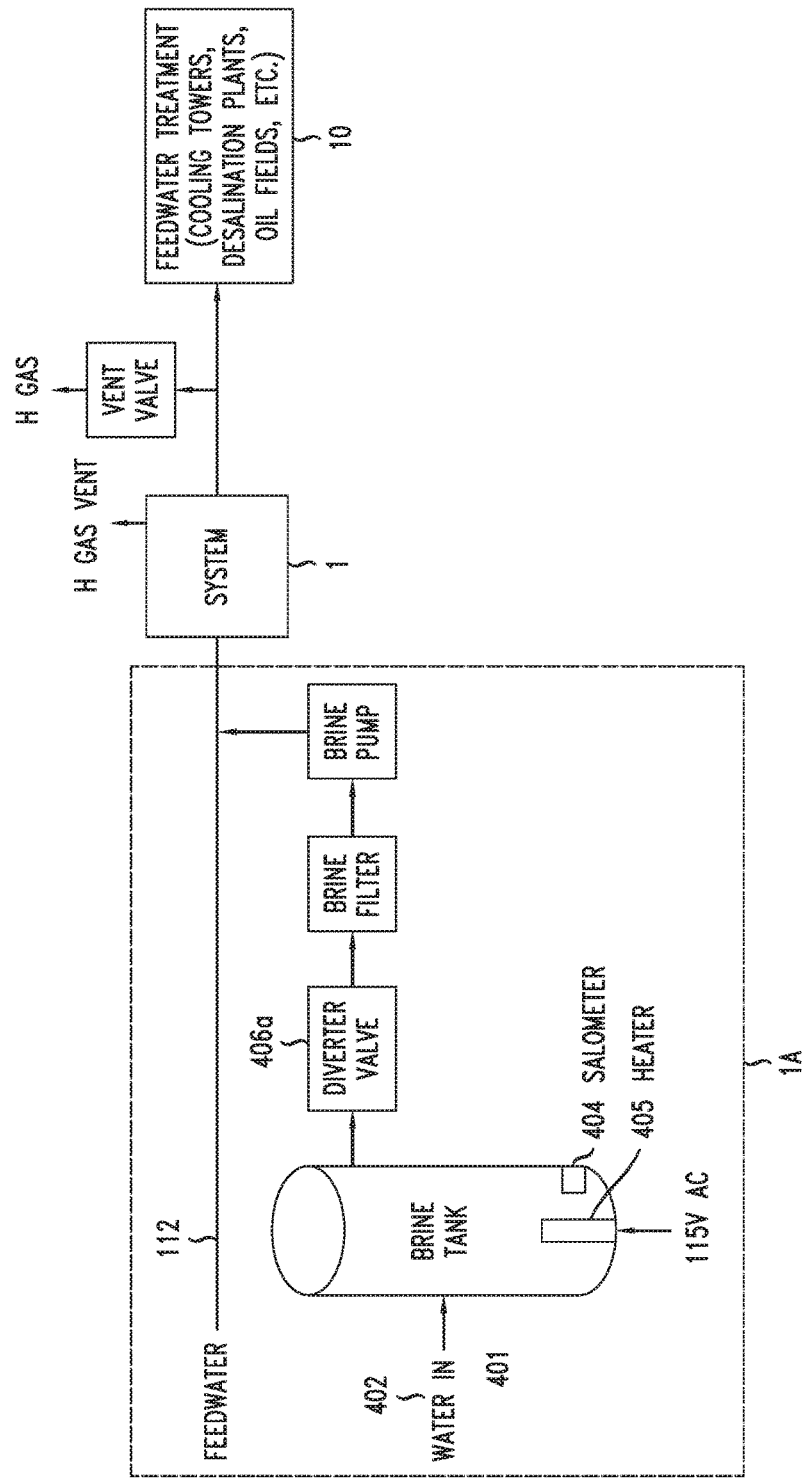

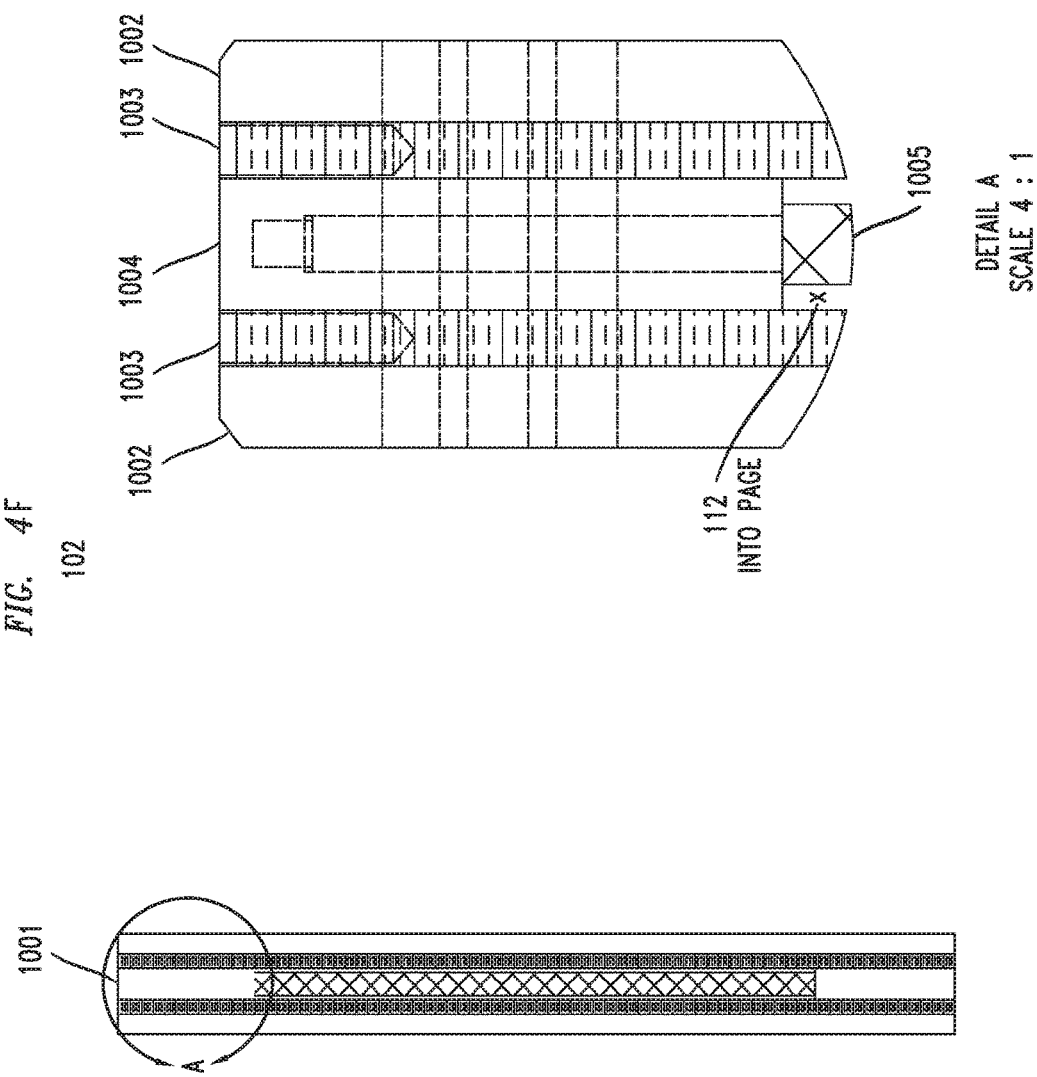

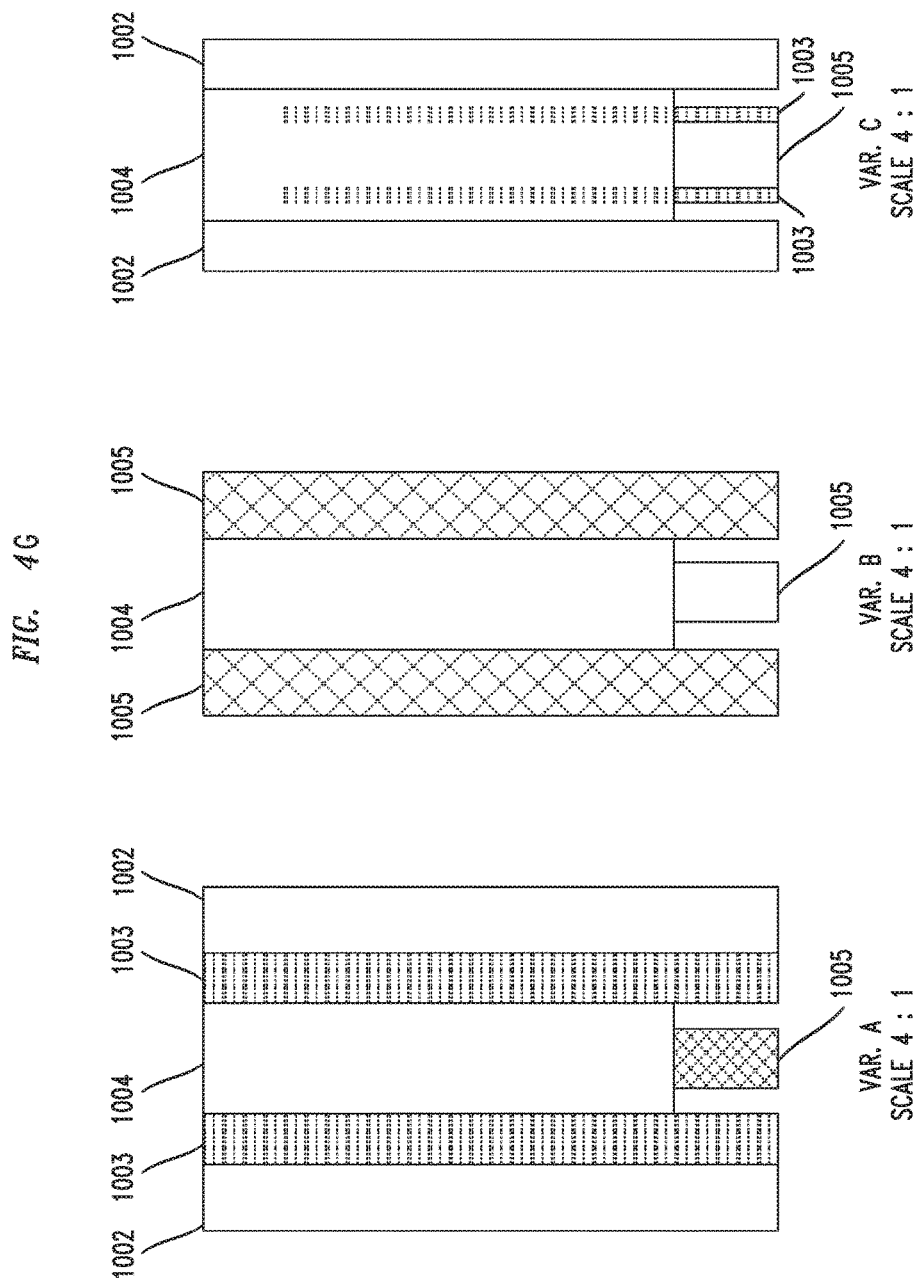

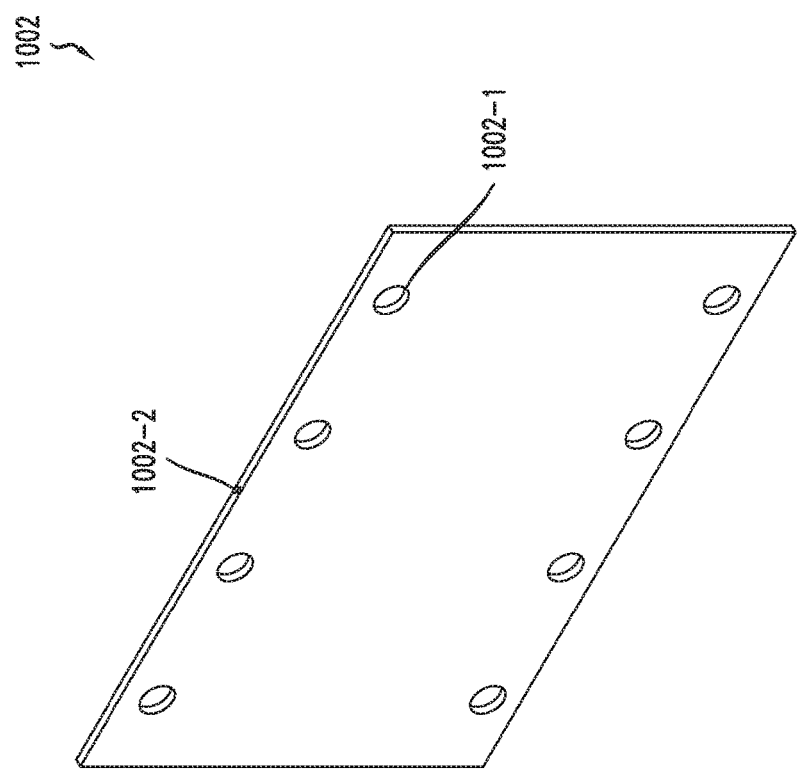

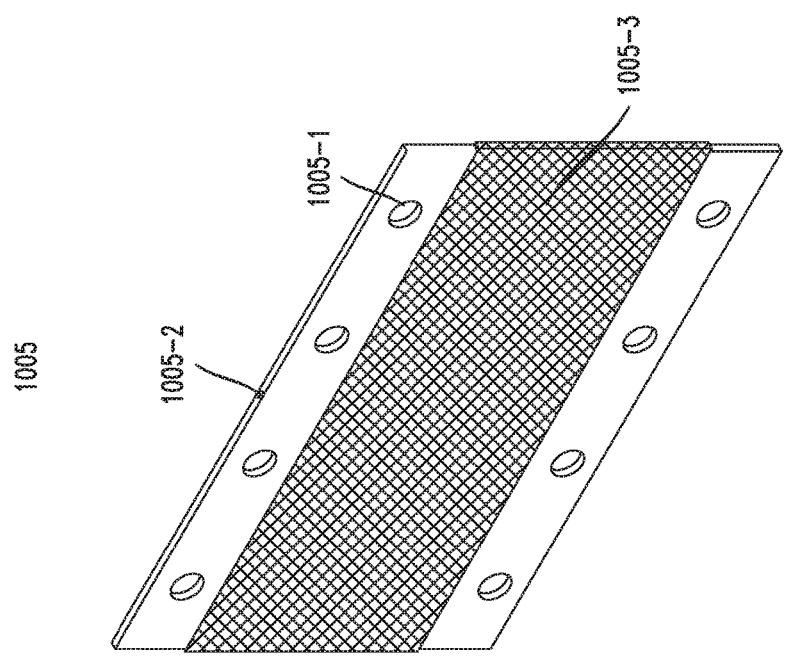

SYSTEMS AND METHODS FOR TREATING INDUSTRIAL FEEDWATER

RELATED APPLICATIONS

The present application is a divisional application of, and claims the benefit of priority from, U.S. patent application Ser. No. 15/926,965 filed Mar. 20, 2018 (the "'965 Application"). This application also is related to U.S. patent application Ser. No. 14/624,552 (the "552 Application"), Ser. No. 14/820,550 (the "550 application), Ser. No. 14/821,604 (the "'604 Application"), Ser. No. 14/979,501 (the "'501 Application"), Ser. No. 15/069,971 (the "'971 Application"), Ser. No. 15/237,124 (the "124 Application"), Ser. No. 15/339,578 (the "578 application") and PCT Application US2017/40838 (the "'838 Application"). This application incorporates by reference herein the entireties of the disclosures of each of the above-identified applications as if set forth herein in full.

INTRODUCTION

Biological contaminants (bacteria, virus, and parasites) in feedwater exchange genetic material by membrane extension—where the membrane of one cell is extended to connect with the membrane of another cell. In this manner, resistant genes within one cell may be shared (i.e., spread) with another cell and, eventually, an entire bacteria community.

Furthermore, many biological contaminants in feedwater generate cell surface proteins that prevent metal ions (silver, copper, zinc), which would otherwise harm the cell, from entering the cell and inactivating the cell.

Thus, there is a need for systems, devise and methods that integrate different biological treatment techniques to minimize the ability of bacteria populations in feedwater from developing resistance over time.

It is also desirable to provide for systems, devices and methods that inactivate biological contaminants in industrial feedwater (i.e. cooling towers, desalination plants, oil fields) to treat scale buildup in order to, among other things, prevent clogged piping systems and to prevent the growth of bacteria.

Yet further, it is desirable to provide for systems, devices and methods that integrate different water treatment techniques to treat scale as well as biological contaminants in industrial feedwater (i.e. cooling towers, desalination plants, oil fields).

Additional devices, systems, related methods, features and advantages of the invention will become clear to those skilled in the art from the following detailed description and appended drawings.

BRIEF DESCRIPTION OF THE DRAWINGS

FIGS. 3A through 3C depict exemplary electromagnetic sections according to embodiments of the invention.

FIG. 4B depicts an exemplary brine treatment subsystem integrated with other treatment systems according to an embodiment of the invention.

FIGS. 4F through 4I depict exemplary electrodes that may be part of a plasma section according to an embodiment of the invention.

Figure 1:
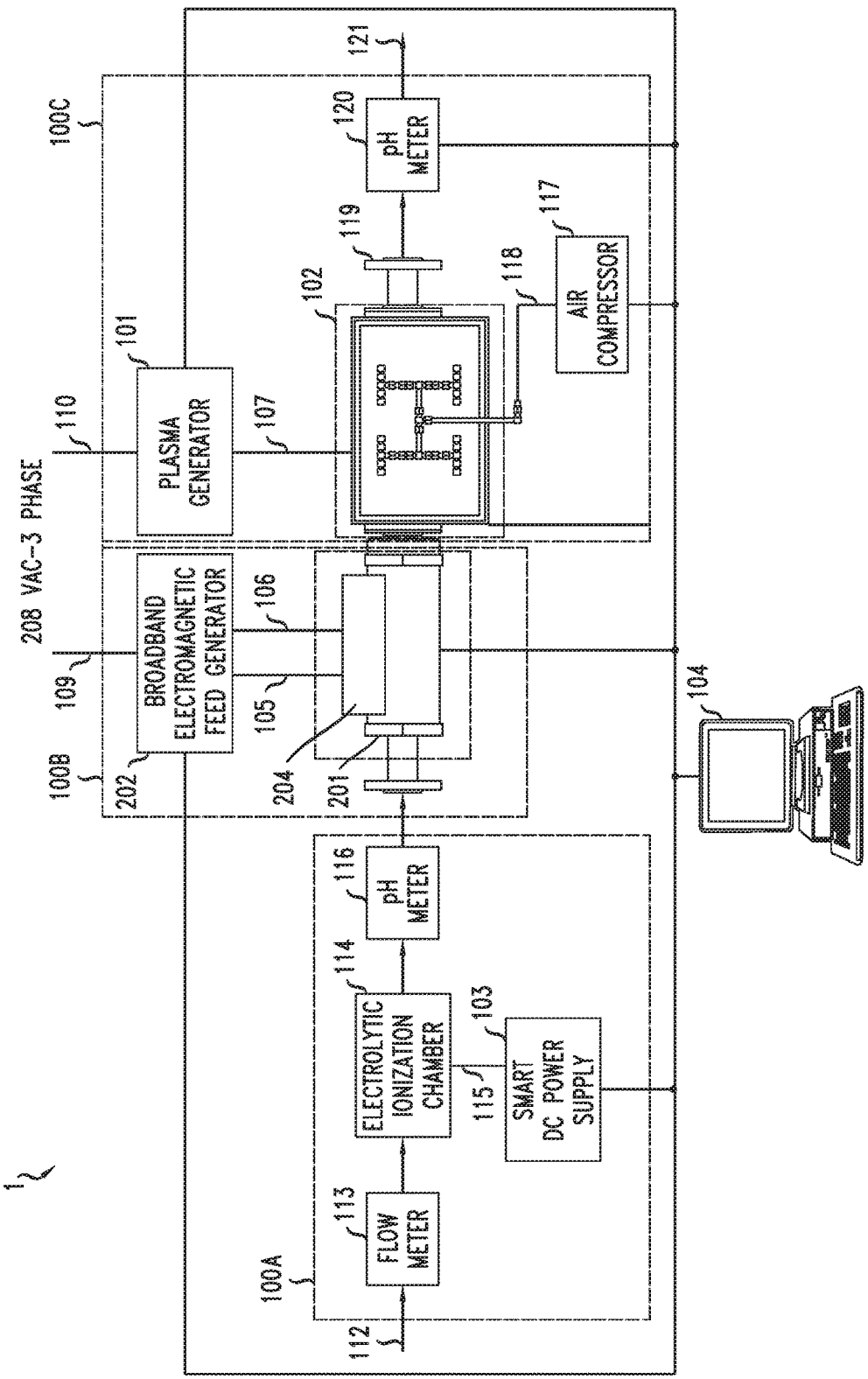
FIG. 1 depicts a system for treating industrial feedwater according to one or more embodiments of the invention.

To the extent that any of the figures or text included herein depicts or describes dimensional information (e.g., inches) it should be understood that such information is merely exemplary to aid the reader in understanding the embodiments described herein. It should be understood, therefore, that other dimensions may be used to construct the inventive devices, systems and components described herein and their equivalents without departing from the scope of the inventions.

SUMMARY

Systems, devices and related methods for treating feedwater are presented.

In one embodiment, an exemplary system for treating feedwater may comprise one or more of the following: a brine treatment subsystem operable to add a brine solution into feedwater to promote the formation of reactive and molecular species in the feedwater; an electrolytic ionization section operable to form an amount of ionized, dissolved metal ions in feedwater; an electro-magnetic section operable to apply modulated electric and magnetic fields to the feedwater to effect the morphology of scale forming ions in the feedwater; and a plasma section operable to apply plasma energy to the feedwater to form reactive and molecular species in the feedwater. The brine solution may comprise a mixture of an electrolyte, such as sodium chloride, and water, for example. In an embodiment, exemplary reactive and molecular species that may be formed may comprise mixed oxidants that exhibit chlor-oxygen chemistry.

The exemplary electrolytic ionization section may comprise one or more positively charged and negatively charged electrodes, and a power supply that may be operable to supply the electrodes with a variable amount of power, wherein the electrodes are operable to form the amount of ionized, dissolved metal ions in the feedwater depending on the magnitude of the current supplied to the electrodes and upon the flow rate of the feedwater.

The exemplary electrolytic ionization section may also comprise one or more switches operable to reverse the polarity of the electrodes to prevent build-up of deposits on an electrode, for example.

In embodiments of the invention, the brine treatment subsystem may comprise either an in-line subsystem or an isolated subsystem and may further comprise a heater that may be operable to heat the brine solution to accelerate the dissolution of sodium chloride in the water.

In an embodiment, the plasma section may comprise a pulse width modulation/pulse density modulation section operable to insure a resonant frequency of the electric field is maintained to further insure the generation of a constant amount of mixed oxidants in the feedwater, for example. Further, the plasma section may be further operable to apply the plasma energy (e.g., plasma discharges, such as plasma streamers) to the feedwater, and to produce one or more of the following in the feedwater: (a) hydrogen ions, (b) hydrogen, (c) ozone gas, (d) hydrogen peroxide, and/or (e) chlorine based reactive oxidative species, for example.

In addition to the exemplary systems, their related devices, and subsystems described above, the present invention provides for related, exemplary methods including, but not limited to, a method for treating feedwater that may comprise: adding a brine solution into feedwater to promote the formation of reactive and molecular species in the feedwater; forming an amount of ionized, dissolved metal ions in feedwater; applying a modulated electric and magnetic fields to the feedwater to effect the morphology of scale forming ions in the feedwater; and applying plasma energy to the feedwater to form the reactive and molecular species in the feedwater.

In addition, the exemplary method may include the application of the plasma energy to the feedwater, and the production of one or more of the following in the feedwater: (a) hydrogen ions, (b) hydrogen, (c) ozone gas, (d) hydrogen peroxide, and/or (e) chlorine based reactive oxidative species, for example.

Additional systems, devices and related methods provided by the invention will become clear to those skilled in the art from the following detailed description and appended drawings.

DETAILED DESCRIPTION, INCLUDING EXAMPLES

Exemplary embodiments of systems, devices and related methods for treating industrial feedwater are described herein and are shown by way of example in the drawings. Throughout the following description and drawings, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise.

As used herein, the term "embodiment" refers to an example of the present invention.

As used herein, the term "operable to" means "functions to".

As used herein the phrase "unwanted material" includes all types of material, in dissolved or undissolved form which degrades or otherwise detracts from a desired quality of a liquid, such as feedwater. One non-limiting example of unwanted material includes, but is not limited to, bacteria and/or scale in wastewater.

As used herein the phrases "treat", "treating," "treatment" and other tenses of the word treat mean the inactivation, mitigation, reduction, removal, minimization, dissolution and elimination of unwanted material and the prevention of such unwanted material unless the context indicates otherwise to one skilled in the art. Further the phrases "treating feedwater" and "treating unwanted material" and their other tenses may be used synonymously herein to describe the treatment of feedwater that contains unwanted material. As used herein the phrase "probe" means an element of one of the inventive devices described herein that may be used to generate and apply one or more fields to feedwater in order to treat the feedwater that contains unwanted material, such as bacteria and/or scale.

It should be understood that when the textual description or drawings herein describe a "microcontroller", "controller" or "computer" (collectively "controller") that such a device includes stored, specialized instructions for completing associated, described features and functions, such as computations or the generation of control signals, for example. Such instructions may be stored in onboard memory or in separate memory devices. Such instructions are designed to integrate specialized functions and features into the controllers, and microcontrollers that are used to complete inventive functions, methods and processes related to treating feedwater that contains unwanted material by controlling one or more inventive systems or devices/components used in such a treatment. Such instructions, and therefore functions and features, are executed by the controllers described herein at speeds that far exceed the speed of the human mind and, therefore, such features and functions could not be completed by the human mind in the time required to make the completion of such features and functions reasonable to those skilled in the art. Further, the inventors know of no existing prior art where the human mind has been used in place of the controllers to complete the features and functions described herein.

The following textual description and drawings may describe or include dimensional information. It should be understood that such dimensional information is merely exemplary and non-limiting, it being understood that other dimensions may be used without departing from the scope of the invention.

It should be understood that the phrase "integrated" means one or more components that are constructed substantially as one unitary device where, generally speaking, the components are connected using short conductors or connectors, are placed on one or more adjacent printed circuit boards or the like that are themselves connected or are formed as one or more miniaturized integrated circuits.

In one embodiment, a system comprising a device for applying plasma energy and electromagnetic fields (e.g. a probe) to feedwater may be combined with an electrolytic ionization chamber to reduce unwanted material, such as bacteria and/or scale, in feedwater. The chamber may be operable to convert metals with biocidal properties into each metal's respective ions, where the ions may be used to inactivate biological contaminants.

Referring now to FIG. 1, there is depicted a system 1 for treating industrial feedwater according to an embodiment of the invention. For purposes of simplifying the explanation that follows, the system 1 may be discussed in terms of three sections: an electrolytic ionization section 100A, an electromagnetic section 100B, and a plasma section 100C though it should be understood that one or more of these sections may be combined into fewer sections or expanded into more than three sections.

As shown, feedwater 112 may flow through an electrolytic ionization chamber 114 of section 100A, then through the electromagnetic section 100B, followed by a plasma section 100C. The treated water may exit the system 1 via output 121 to be used in an industrial application according to one embodiment of the invention. In alternative embodiments the feedwater may flow through sections 100A to 100C in a different sequence if the sections 100A to 100C) are re-configured or re-arranged (e.g., 100A to 100C to 100B). Further, though not shown in FIG. 1, upon exiting the last section, such as section 100C, at output 121 some or all of the feedwater 112 may be rec-cycled or re-circulated back to one or more of the sections 100A to 100C.

Figure 2:
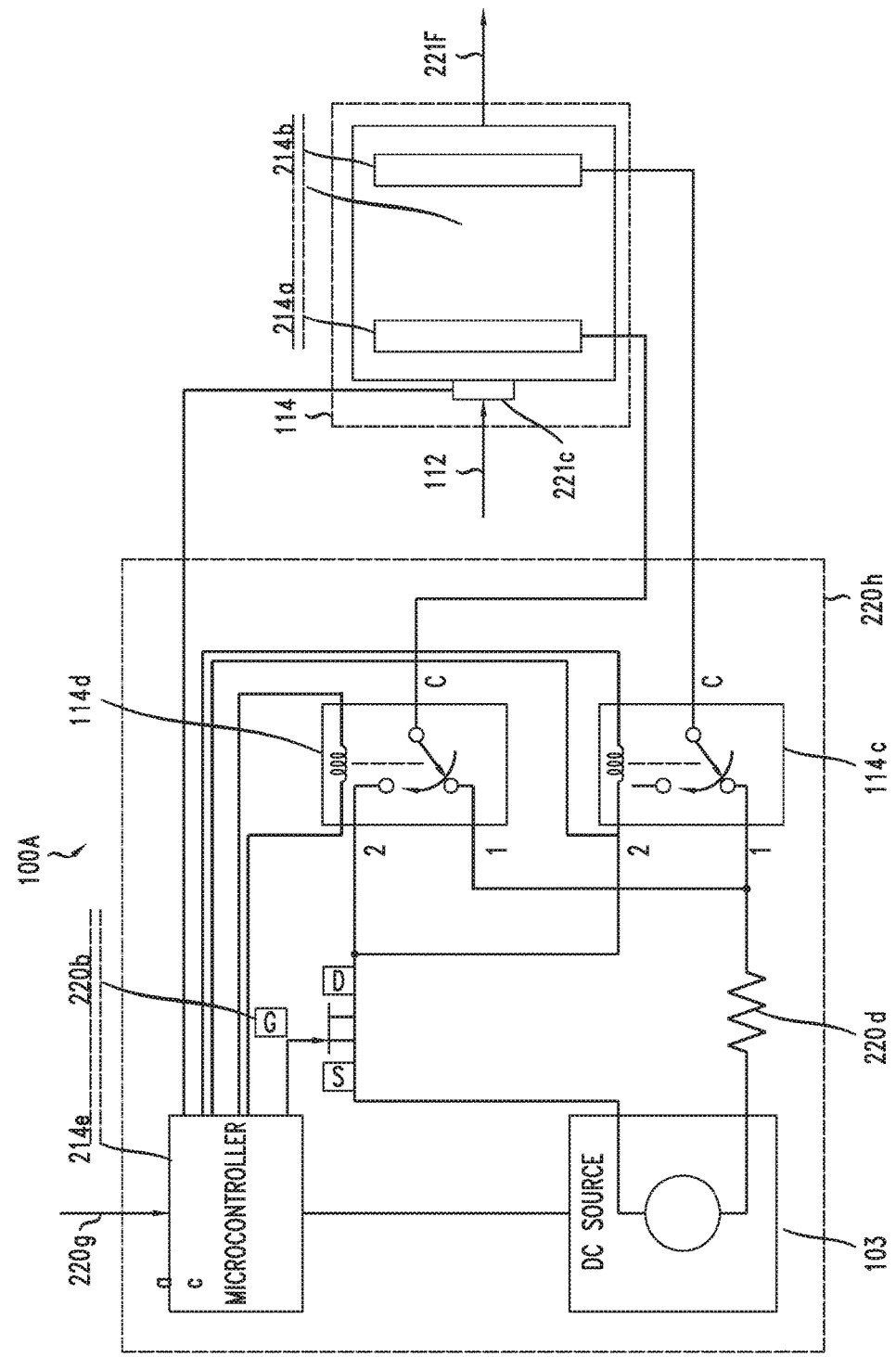
FIG. 2 depicts an exemplary electrolytic ionization section according to an embodiment of the invention.

Referring now to FIG. 2, in an embodiment the electrolytic ionization section 100A may comprise the chamber 114 that may include one or more positively charged anodes 214$a$ and negatively charged cathodes 214$b$ (collectively "electrodes") and a direct current (DC) power supply 103. The power supply 103 may be operable to supply the electrodes 214$a$, $b$ with a variable amount of DC power. In turn, the electrodes 214$a,b$ may be operable to form an amount of ionized, dissolved metal ions in the feedwater 112 depending on the magnitude of the DC current supplied to the electrodes 214$a,b$ by the power supply 103 and upon the flow rate of the feed water through the electrodes 214$a,b$. Switches 214$c,d$ (e.g., electrical, electronic, microelectronic, etc.) may be included that may be operable to (i.e., function to) reverse the polarity of the biocidal electrodes 214$a,b$ and can be controlled with a microcontroller 214$e$ (via an RS485 bus, for example) which may be one and the same as controller 104 shown in FIG. 1, or may be a separate controller. From section 100A, the feedwater 112 may flow to the electromagnetic section 100B. The biocidal ions released into the feedwater 112 function to inactive bacterial contaminants in the feedwater 112 according to one embodiment of the invention.

Figure 3A:
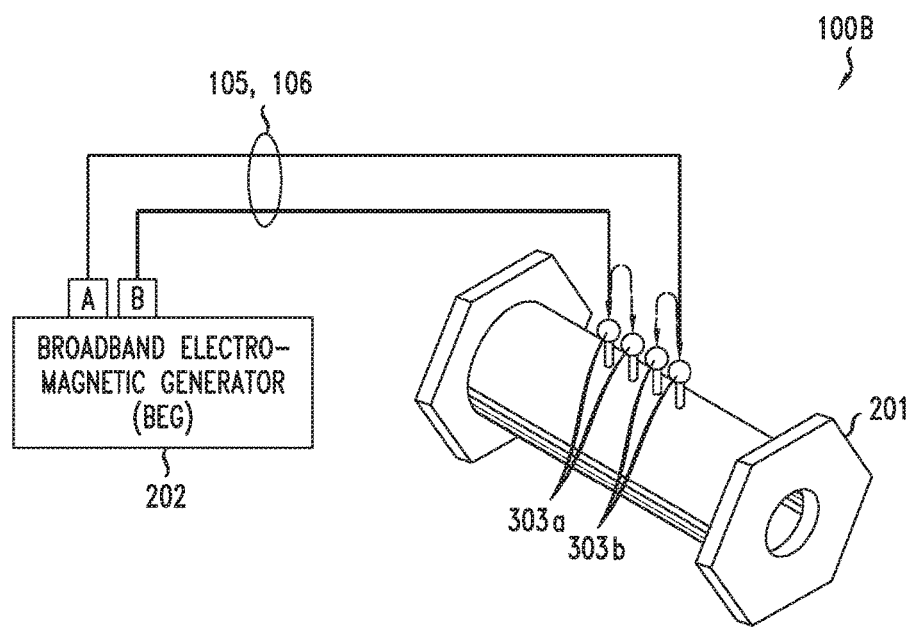
Figure 8:
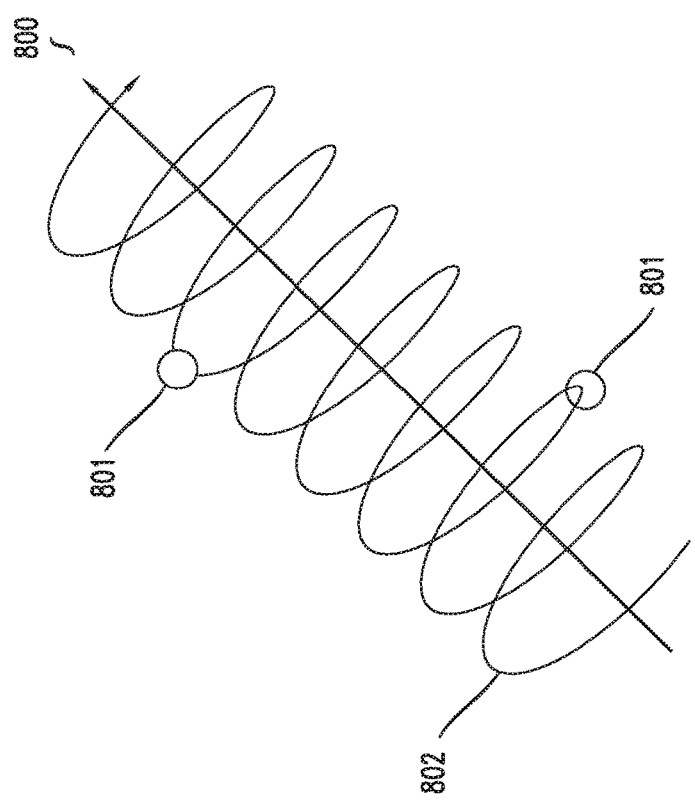
FIG. 8 depicts exemplary motion of an accelerated ion moving in an exemplary spiral, helical, or cycloid motion.

Referring now to FIG. 3A, the system 1 may also comprise an electromagnetic section 100B. In an embodiment, the section 100B may comprise a broadband, electromagnetic signal generator 202 ("generator" for short) and probe 203. In an embodiment, the generator 202 may be connected to the probe 201 via conductors (e.g., coaxial transmission cables) 105,106. In an embodiment, the probe 201 may comprise inner and outer electrodes 303$c$, 303$d$ (see FIG. 3B) that may be operable to generate and apply time varying or steady-state, modulated electric and magnetic fields, perpendicular to each other, for example. The inventors believe that the application of such fields to feedwater 112 causes ions in the feedwater 112 to simultaneously accelerate (i.e., speed up) and move in a spiral, helical, or cycloid motion (see ions 801 moving in a spiral path 802 around an axis 800 in FIG. 8, for example). Because of such movement, ions present in the feedwater 112, which may form scale (i.e. calcium, magnesium) if untreated, remain soluble in the feedwater 112. Using the total electric field, including the electric field induced by the magnetic field, one or more specific scaling ions can be targeted for treatment to effect (i.e., soften) the morphology of the scale forming ions in the feedwater 112.

Figure 4A:
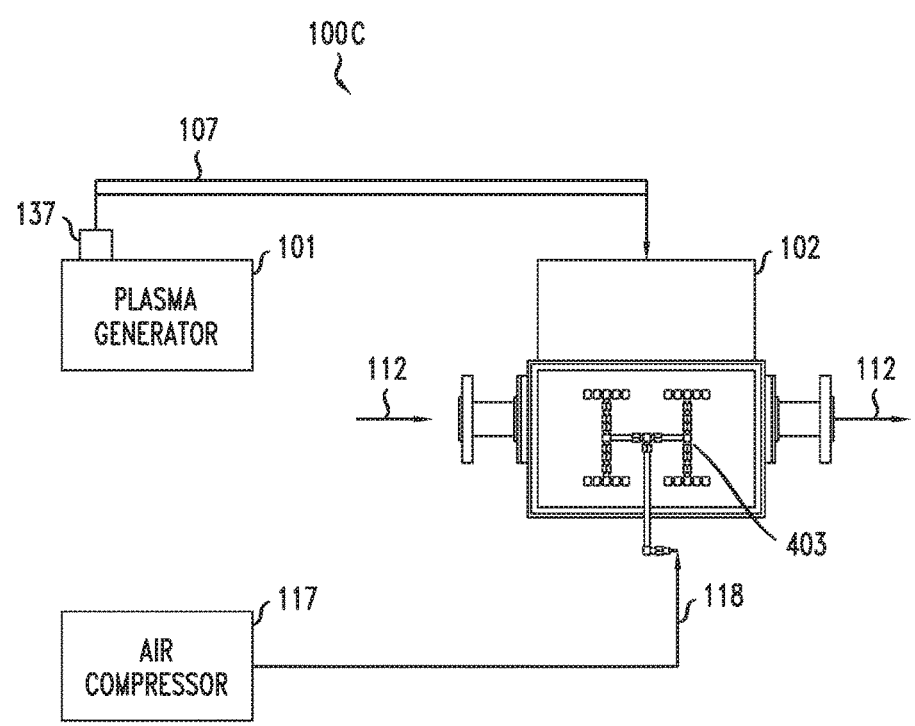
FIG. 4A depicts an exemplary plasma section according to an embodiment of the invention.

Referring now to FIG. 4A, there is depicted an exemplary plasma section 100C according to an embodiment. As shown the section 100C may comprise a plasma generator 101 and plasma probe 102 operable to generate and apply plasma energy to feedwater 112 in order to form, among other things, reactive and molecular species in the feedwater 112 to further treat scale, biological contaminants (biofilm, *Legionella* bacteria, etc.), and biologically induced corrosion. The feed water 112 may enter the plasma probe 102 from the electromagnetic section 100B and exit the plasma probe 102 so that it can be used in an industrial application.

Figure 4C:
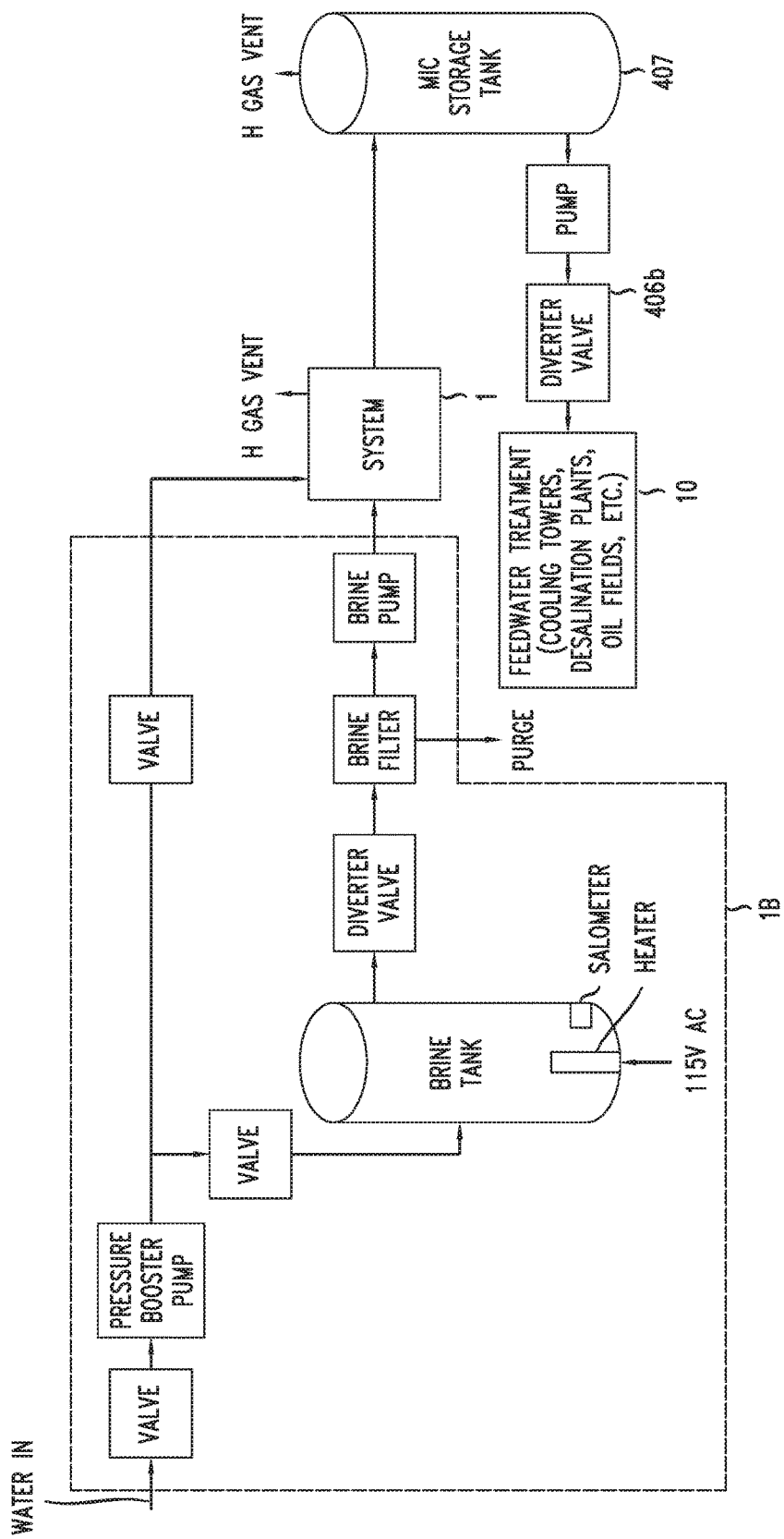
FIG. 4C depicts an exemplary brine treatment subsystem that is connected to other treatment systems according to an embodiment of the invention.

In embodiments of the invention, system 1 may be combined with a brine treatment subsystem 1A as depicted in FIGS. 4B and 4C.

Referring now to FIG. 4B, the subsystem 1$a$ may be operable to add a brine solution (e.g., a homogeneous mixture of sodium chloride and water, e.g., potable water) into the feedwater 112 to promote the formation of the reactive and molecular species in the feedwater 112.

The embodiment depicted in FIG. 4B illustrates the system 1 and subsystem 1A integrated to form an in-line treatment system (i.e., in-line subsystem 1A), where the system and subsystem 1,1A treat the feedwater 112 as it flows to other industrial equipment 10 which make use of the feedwater 112, such as a cooling tower. In this embodiment, the feedwater 112 flow rate to the system 1 is limited (e.g., an upper bound for the allowable flow rate exists).

Continuing, the brine solution may be stored in a brine tank 401 that contains water 402 prior to treatment by other elements of the system 1 and subsystem 1A.

The brine solution may compose a minimum 3.5 kilogram of sodium chloride (NaCl, or "salt") per kilogram of water, which is believed to be a concentration sufficient to generate mixed oxidant products in the feedwater 112. In an embodiment, a heater 405 may be added that is operable to (i.e., again functions to) heat the brine solution in the tank 401 in order to accelerate the dissolution of the salt in the water, along with agitation. A salometer 404 may function to ensure appropriate, minimum salt concentrations are generated to produce mixed oxidants. In embodiments, the salt concentration of the brine may be increased depending on the needs of the specific application by, for example, adding more salt.

In an embodiment, the introduction of salt composed of "free" chlorine into the brine solution enables the generation of reactive and molecular species that comprise mixed oxidants that exhibit chlor-oxygen chemistry, rather than traditional chlorine chemistry. Nonetheless, the chemical load of the chlor-oxygen mixed oxidants may still be measured in terms of free chlorine.

A brine treatment subsystem 1B provided by the present invention may also be used in an isolated process as illustrated in FIG. 4C (i.e., isolated subsystem 1B). In this embodiment, the tank 407 may function as a storage or collection device to collect and store treated water which contains generated mixed oxidants in a batch process. The water containing the mixed oxidants may then be combined with existing feedwater 112 (e.g. cooling tower water) in industrial equipment. In comparison with the in-line embodiment, water is first treated by the mixed oxidants generated by the electrolytic ionization section 100A, is then stored in tank 407 and later used with feedwater flowing to the cooling tower, 10 etc.

Diverters (e.g., valves) 406a, b in FIGS. 4B,4C may be included in systems 1A,1B to allow water to pass through that, for example, does not contain the added brine (i.e. for cleaning).

As described herein, it is believed that the generation of chlor-oxygen mixed oxidants in feedwater in accordance with embodiments of the present invention provides many improvements over existing techniques, among them:

1. Chlor-oxygen mixed oxidants may be produced without the need to use a separate supply of chlorine gas;
2. Embodiments of the invention include pulse density modulation (PDM) auto tuning that allows the concentration of chlorine to be more easily adjusted versus existing techniques;
3. Replaces the use of highly corrosive chemicals/agents, such as biocide and algaecide treatments, thus increasing the lifetime of the physical structure of the treatment systems as well as reducing the cost since such corrosive agents need not be used (e.g., transportation of such agents, operation and maintenance costs);
4. The brine solutions produced by embodiments of the present invention are diluted and are composed of stable chlor-oxygen mixed oxidants that do not require stabilizing agents;
5. The hypochlorous acids generated by embodiments of the invention are generally recognized as safe (GRAS) and are not as harsh or corrosive as is phosphoric or sulfuric acid that are typically used in existing systems, thus, allowing treatment of feedwater in areas not normally suitable for treatment with such chemicals;
6. In embodiments, only water and salt are used to generate the mixed oxidants, making the inventive systems and related methods environmentally friendly;
7. The high biocidal capacity and low chemical load of treated feedwater provided by embodiments of the present invention minimizes the need to further treat the feedwater when it is eventually discharged, such as during so-called "blow downs" involving cooling tower systems;
8. The treatment of feedwater by the application of high-energy, plasma energy fields in embodiments permits the rapid dissipation of free chlorine (e.g., a half-life of 1.3 to 5 hours) once the fields are removed compared with existing systems that form such chlorine (i.e., chemical bonds) without using such fields (i.e., they use chemical mixing). Said another way, ordinarily, free chlorine may be formed by mixing the appropriate chemicals which, over time, forms the required chemical bonds. In comparison, the high-energies applied to the brine enriched feedwater act quickly to help form the appropriate chemical bonds. Conversely, when the high-energy fields are removed, the bonds forming the free chlorine quickly dissipate when compared to existing systems;
9. Complies with all EPA standards for maximum chlorine allowed in feedwater;
10. The minimization of hard, needle-like crystalline (calcite) scale within the feedwater improves the heat transfer efficiencies of cooling tower, heat exchangers and related equipment; and
11. In embodiments, sulfides may be oxidized, which aids in odor removal.

Electrolytic Ionization Section

Referring again to FIG. 2, the exemplary electrolytic ionization section 100A may comprise the chamber 114 enclosing a positively charged anode 214a and a negatively charged cathode 214b through which feedwater 112 may flow. The anode 214a and cathode 214b electrodes can be composed of one or more of the following, non-limiting exemplary materials: arsenic, antimony, cadmium, chromium, copper, mercury, nickel, lead, silver, and zinc, for example.

As previously indicated, the section 100A may further comprise a microcontroller or microprocessor 214e (collectively "controller") and a direct current (DC) power supply 103. In an embodiment, the controller 214e may be operable to control the DC power supply 103 (by exchanging control signals with the supply 103, for example) such that the voltage and corresponding current generated by the supply 103 may vary (i.e., a variable voltage and/or current).

In an embodiment, the controller 214e may be further operable to control the polarity of the electrodes 214a, b. For example, the controller 214e may be operable to send control signals to switches or relays 214c, d, respectively, to reverse or change the polarity of electrodes 214a, b from positive to negative, and negative to positive, for example. As depicted in FIG. 2, upon receiving such control signals the relays 214c, d may be operable to connect a negative or positive voltage to a respective electrode 214a, b. In accordance with principles of the invention, by alternating the polarity of the electrodes 214a, b leaching of ions from the electrodes 214a, b may be controlled.

In more detail, the polarity of each electrode 214a, b determines whether ions will leach from, or to, the electrode. For example, when the polarity is positive at electrode 214a and negative at electrode 214b then ions will leach from electrode 214a. Conversely, when the polarity of electrode 214a is negative and the polarity of electrode 214b is positive, ions will leach from electrode 214b. The ability to control the polarity of the electrodes 214a, b, therefore, also allows the controller 214e to effectively control the leaching of ions (e.g., metal ions) from one electrode to another via, and to, the feedwater 112. Relatedly, the ability to control the leaching of ions from the electrodes 214a, b further allows the controller 214e to minimize the build-up of ionic material on the cathodic electrode (i.e., the electrode that ions flow to after having leached from an opposite electrode). Said another way, to avoid too much build-up of ionic material on one electrode, the controller 214e may be operable to change the polarity of the electrodes 214a, b to reverse their polarity, and, therefore reverse the flow of ionic material (and related build-up) from one electrode to another.

In more detail, the transfer of material may be controlled by controlling the voltage applied to the electrodes 214a, b. For example, for a given amount of energy within a given voltage (i.e., a DC electric charge), the mass (amount) of the material leached from an electrode is directly proportional to the equivalent weight of the electrode's material and can be computed using Faraday's second law of electrolysis:

$$m = \left(\frac{Q}{F}\right)\left(\frac{M}{z}\right) \qquad (1)$$

where (m) is the mass of the material liberated at an electrode, (Q) is the total electric charge passed through the material, (F) is Faraday's constant, (M) is the molar mass of the material, and (z) is the valency number of ions of the material. The following exemplary chemical reactions represent the release of biocidal ions from an electrode composed of an alloy of both silver and copper through electrolytic ionization (described above):

  (2)

  (3)

In an embodiment, exemplary silver and copper alloy-based electrodes may be composed of a variable amount of silver and copper. For example, the range of silver-to-copper may be a minimum of 60:40 silver to copper while a maximum may be 80:20. As material (cupric and silver ions) are released from an electrode (i.e., leached), their release causes the electrode to be gradually consumed. Further, it is believed that once the cation ions (cations for short) have been released into the feedwater 112, the cations react with negatively charged portions of bacteria in the feedwater 112 (e.g., cell walls of the bacteria) to form electrostatic bonds. The energy (force) associated with the formation of the bonds is believed to lead to the distortion of the cell wall of the bacteria (i.e., the walls become more permeable and eventually breakdown, causing cell lysis and cell death). For example, a positively charged cation will attract a negatively charged ion that comprises an integral portion of the cell wall. As a result of the attractive force, the negatively charged ion will feel a force that is pulling it away from the surrounding cell wall, leading to a weakness and even breakdown of the cell wall. In an embodiment, this process may be simultaneously felt by a plurality of negatively charged ions making up the cell wall, leading to an overall weakness and breakdown of the cell wall. Once the cell wall is effectively weakened or broken down, the bacteria becomes substantially weakened or even destroyed.

The section 100A may further include a flowmeter 113 (see FIG. 1). In an embodiment, the flowmeter 113 may be configured or positioned to determine the rate that the feedwater 112 flows into the chamber 114. In an embodiment, the determined flow rate may be sent to the controller 214e via a wired or wireless connection in the form of one or more electronic signals. Thereafter, the controller 214e may be operable to compute both an instantaneous and averaged concentration of dissolved ions based on the received signals, and, thereafter, may be operable to control the power up or down (voltage) that the DC power supply 103 is supplying to the electrodes 214a,214b. In an embodiment, a higher power may result in a greater leaching of metal ions into the feedwater 112 which, in turn, has the effect of increasing the "bombardment" of metal ions onto the chemical bonds that hold scale-forming compounds in the feedwater together. Such bombardment weakens and may even destroy the chemical bonds making it difficult for the scale forming minerals to form hard, needle-like crystalline (calcite) scale.

Electro-Magnetic Section

Figure 3B:
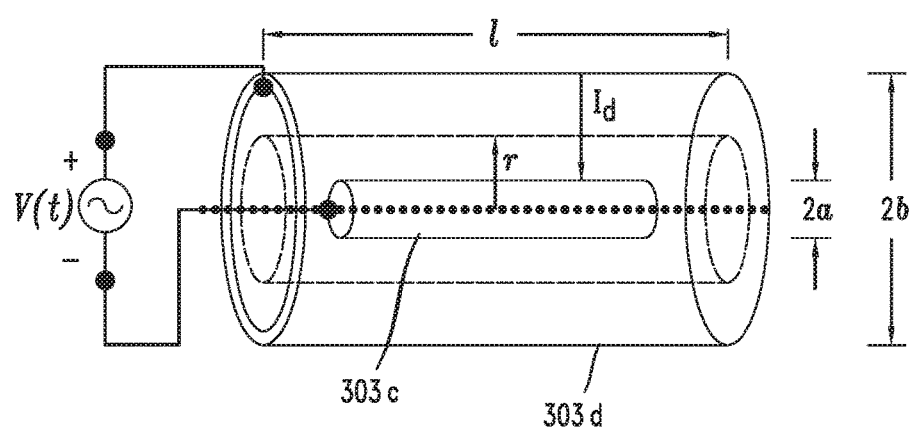

Referring now to FIG. 3B, there is depicted an exemplary electro-magnetic section 100B according to an embodiment of the invention. As depicted, the section 100B may comprise a broadband electromagnetic generator 202 with an output impedance of 50-ohms. The generator 202 may be operable to supply signals at radio-frequency (RF) frequencies into the input port of a 50-ohm probe 201 via one or more conductors (e.g., a 50-ohm impedance coaxial transmission cables) 105,106 that connects the generator 202 to the probe 201. The signals supplied to the probe 201 may be used by the probe 201 to generate an electro-motive force (EMF) referred to hereafter as an applied Voltage (V). The signals applied to the probe 201 may comprise sine wave signals having a carrier operating frequency within the following ranges(s): 13.58 MHz, 27.15 MHz, 40.68 MHz, 912 MHz-925 MHz, 2.40 GHz-2.5 GHz, 5.7 GHz-5.8 GHz, and 24 GHz, inclusive of the lower and upper end frequencies, for example. Further, the generator 202 may be operable to modulate one or more of the signals supplied to the probe 201 at an ionic cyclotron frequency (or a range of frequencies) of unwanted material (scale forming minerals, precipitants, etc.) in the feedwater 112.

The electro-magnetic section 100B may comprise an electric field component 303c,303d and a magnetic field component 303e, f. For the present, we turn to a discussion of the magnetic field component—we shall return to a discussion of the electric field component thereafter.

The magnetic field component 303e, f may comprise radial coils configured in a Helmholtz coil configuration. Accordingly, in an embodiment the strength of the magnetic field from Helmholtz coil configuration, $B_{COIL}$, is the sum of the strengths of the magnetic fields from both radial coils 303e, f $B_{RAD1}+B_{RAD2}$.

Figure 9:
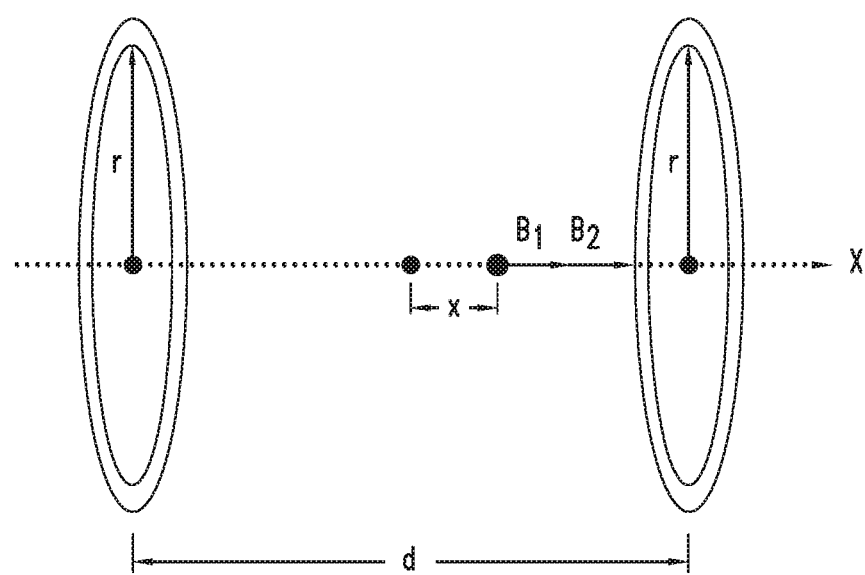
FIG. 9 depicts representative magnetic fields.

In the Helmholtz configuration, the separation distance (d) between the coils 303e, f equals the radius (r) of the coils, while the distance from the midpoint of the separation distance between the coils is (x). The probe's total generated magnetic field $B_{COIL}=B_{RAD1}+B_{RAD2}$ any point that equals (x) can be determined using the following equation:

$$B_{COIL} = B_{RAD1} + B_{RAD2} = \frac{\mu_0 N I r^2}{\left(\left[\frac{d}{2}-x\right]^2 + r^2\right)^{\frac{3}{2}}} + \frac{\mu_0 N I r^2}{\left(\left[\frac{d}{2}+x\right]^2 + r^2\right)^{\frac{3}{2}}} \quad (4)$$

where the current is (I), the number of coil turns is (N) and ($\mu_o$) is the permeability of the copper coils. Referring to FIG. 9, the probe's 201 magnetic field ($B_{COIL}$) may be uniform where (x)=0 am for both radial Helmholtz coils 303e, f. If the current is (I), the number of coil turns is (N) and ($\mu_o$) is the permeability of the copper coils, then;

$$B_{COIL}=8\mu_0 NI/\sqrt{125}r \quad (5)$$

Further, the generated magnetic field ($B_{COIL}$) produces an induced electric field ($E_{IND}$) with (r) being the radius of the radial Helmholtz coils 303e, f according to Faraday's law.

The induced electric field ($E_{IND}$) is then:

$$E_{IND} = \frac{1}{2} \cdot B_{COIL} \cdot r \quad (6)$$

Thus, the magnetic field component generates both a magnetic field and an induced electric field. Conversely, the electric field component generates an electric field and an induced magnetic field. Each if these four fields contribute to the treatment of unwanted material in the feedwater 112.

Turning now to the electric field component, in an embodiment it may comprise an inner electrode 303c and an outer, cylindrical electrode 303d. Upon receiving a supplied signal from the generator 201, the electrodes 303c, d are operable to generate an applied voltage V between the electrodes 303c, d. The applied voltage V can be computed as follows:

$$V=Q/2\pi\varepsilon rl\cdot\ln(a/b) \quad (7)$$

where the radii of the electrodes are (a) and (b) respectively, and the length of the electrode is (l). In embodiments where the lengths of the two electrodes differs, l, is the length of the shortest electrode. Similarly, an exemplary electric field strength can be computed between the electrodes 303c, d as follows. The charge on the electrodes 303c, d over a period of time (t) may be represented as (Q), and the charge per unit length λ=Q/l. Thus, the electric field (E) between the electrodes may be represented as:

$$E = Q/2\pi\varepsilon rl, \text{ where } Q=\lambda l, \text{ and } E=\lambda/2\pi\varepsilon r \quad (8)$$

In embodiments of the invention, the application of a time-varying electric field by the electrodes 303c, d to unwanted material in the feedwater 112, such as scaling forming ions, is believed to cause such ions to rapidly move back and forth between the electrodes 303c, d one of which may be negatively-charged while the other may be positively-charged, and vice-versa. This rapid back-and-forth movement is believed to promote bulk precipitants and alters the morphology of these precipitants to be softer and remain in solution. For example, the inventors have completed experiments where the calcite form of calcium carbonate in the feedwater is vaterite or aragonite, which are softer than hardened scale.

The electric field (E) generated by the electrodes 303c, d creates an induced magnetic field ($B_{IND}$). The induced magnetic field ($B_{IND}$) is governed by the Ampere-Maxwell Law and itself generates a displacement current ($I_d$) which flows through an imaginary cylindrical surface (S), with a length (l) and radius (r) (see FIG. 3B). Computationally the induced magnetic field can be derived from the following relationships.

The current flowing from the outer cylindrical electrode 303d to the inner cylindrical electrode 303c crosses surface (S) (see FIG. 3B), where:

$$S = 2\pi \cdot l \cdot r \quad (9)$$

Gauss's Law is responsible for the electric flux density (D)=$\varepsilon_o \cdot \varepsilon_r \cdot E$, hence, the displacement current, $I_d$, can be computed as a factor of the surface S as follows:

$$I_d = \frac{\partial D}{\partial t} \cdot S = \frac{\partial}{\partial t} \cdot (D) \cdot (2\pi \cdot r \cdot l) \quad (10)$$

The induced magnetic field ($B_{IND}$) as a result of the electric field (E) can therefore be calculated based on the displacement current ($I_d$), as follows:

$$B_{IND} = \mu_o I_d / 2\pi r \quad (11)$$

In embodiments of the invention, the total magnetic field ($B_{TOT}$) generated by the magnetic and electric field components is a summation of the magnetic field of the Helmholtz coils 303e, f ($B_{COIL}$) and the induced magnetic field ($B_{IND}$). Conversely, the total Electric field ($E_{TOT}$) is a summation of the induced Electric field ($E_{IND}$) from the Helmholtz coils and the electric field (E) of the electrodes 303c, d.

The inventors have discovered that the application of electromagnetic fields to the feedwater 112 creates Lorentz forces on the scale-forming ions in the feedwater 112. Charged ions (q), travelling with velocity (v), in the presence of the total electric field (E) and the total magnetic field (B) undergo a Lorentz force (F):

$$F = q[E_{TOT} + (v \times B_{TOT})] \quad (12)$$

The inventors believe that charged ions follow a helical (cycloid) motion under the influence of the total magnetic field. The helical motion radius is referred to as the gyro- (or cyclotron) radius, $r_g$, and may be calculated as follows:

$$r_g = mv/qB_{TOT} \quad (13)$$

where (m) is the mass of the cation or anion, (v) is the velocity perpendicular to the direction of the total magnetic field, (q) is the charge of the total electric field, and ($B_{TOT}$) is the total magnetic field. The total electric field ($E_{TOT}$) is believed to accelerate the ions in the feedwater 112 until a constant drift velocity, $v_d$, is reached. The drift velocity can be calculated from:

$$v_d = \mu E_{TOT} \quad (14)$$

Where ($v_d$)=drift velocity, (E) is the electric field, and (μ) is the electrical mobility. Electrical mobility is proportional to the net charge of the ions (cations and/or anions), and its magnitude is the charge of the ions (cations and/or anions). Using the total magnetic field ($B_{TOT}$), the ionic cyclotron frequency ($f_{CR}$) of a scale forming ion can be calculated:

$$\omega = 2\pi f = \frac{z \cdot e \cdot B_{TOT}}{m} \quad (15)$$

$$f = z \cdot e \cdot B_{TOT} / 2\pi m \quad (16)$$

where ω is the radian frequency of the positive or negative charges of the ions, (z) is the number of positive or negative charges of the ions, (e) is the elementary charge, and (m) is the mass of the ions.

For example, a total magnetic field ($B_{TOT}$) of 20 micro-Tesla would produce an $f_{CR}$ of approximately 15.3 Hz for Calcium. It is believed that to accelerate and helically spin the ions in order to prevent the ions from forming into hardened scale the applied magnetic field must maintain a constant total magnetic field that corresponds to an ionic cyclotron (modulation) frequency $f_{CR}$.

In embodiments, scale forming ions in the feedwater 112 may be effectively treated using the $f_{CR}$ modulating frequencies set anywhere from 1 Hz to 5000 Hz, 5 kHz to 20 MHz at up to 100% modulation depth, for example.

In more detail, because $f_{CR}$ is believed to be directly proportional to the magnitude of the total magnetic field ($B_{TOT}$), $f_{CR}$ will change if the magnitude of an applied electromagnetic field is not held at a constant. Accordingly, in embodiments of the invention as the conductivity of the feedwater 112 entering the electromagnetic section 100B changes due to changes in, among other things, the mineral concentration of the feedwater 112, the effective electric field ($E_{TOT}$) and magnetic field ($B_{TOT}$) applied to the feedwater will change as well due to a change in impedance (discussed elsewhere herein). Thus, to avoid unnecessary changes to the ionic cyclotron frequency $f_{CR}$ (i.e., to avoid having to constantly apply different modulation frequencies), embodiments of the invention incorporate impedance matching circuitry (discussed elsewhere) to insure that the effective electric field ($E_{TOT}$) and magnetic field ($B_{TOT}$) are constantly held at a level that corresponds to a desired $f_{CR}$.

Said another way, the inventors believe that if a constant total magnetic field ($B_{TOT}$) is not applied to the feedwater, then the modulation frequency of the applied total magnetic field would have to be continually adjusted to correspond with a different ionic cyclotron frequency $f_{CR}$ of such ions. Such adjustments would add complexity to the inventive systems and, perhaps, be impractical if the modulation frequency required was very low. Accordingly, embodiments of the invention are operable to maintain a desired, constant total magnetic field ($B_{TOT}$).

It should be further noted that, from Equation (14), it can be seen that the gyro-(or cyclotron) radius, $r_g$, of ions traveling in the feedwater 112 is inversely proportional to the total magnetic field ($B_{TOT}$). Accordingly, in embodiments of the invention an increase in the total magnetic field leads to a decrease in the gyro-cyclotron radius which, for example, keeps calcium ions in water flowing through a pipe in a region towards the center of the pipe, away from the pipe walls, preventing the precipitated scale from adhering to the pipe walls. In effect then, by controlling the total magnetic field generated by the systems, devices and methods provided by the present invention such systems, devices and methods also control the morphology of the scale forming ions in the feedwater 112.

Below is an example of a Calcium ion ($Ca^{2+}$) $f_{CR}$ calculation.

$$e = 1.6020e^{-19} \qquad A \cdot s$$
$$z = 2$$
$$B = 20e^{-6} \qquad kg/A \cdot s^2$$
$$m = 40.078 \qquad \text{Atomic Mass Unit (Dalton)}$$
$$m = 40.078 * 1.66053878283e^{-27} \quad kg$$

$$f = \frac{z*e*B}{m*2\pi} = \frac{2*1.6020e^{-19}*20e^{-6}}{40.078*1.660538e^{-27}*2\pi} = 15.3245 \text{ Hz}$$

Accordingly, in embodiments of the invention the electromagnetic section 100B may be operable to generate and apply an electromagnetic field having a constant, total amplitude (voltage) to feedwater 112, where the signal making up the field may take the form of either a square, sinusoidal, and triangular modulating waveform superimposed on a carrier frequency, for example, to treat unwanted material, such as scale-forming ions in the feedwater 112.

As mentioned previously above, in practice the concentration of minerals, such as scale-forming ions, in feedwater 112 will change over time due to external and internal conditions. Such changes affect the conductivity of the feedwater 112. Realizing that such conductivity changes could substantially, adversely impact the ability to maintain an applied magnetic field having a constant amplitude which in turn would adversely affect the ability to keep scale-forming ions in the feedwater from forming hardened scale, the inventors discovered that a system, such as system 1, that includes the ability to adjust the impedance of section 100B as the conductivity of the feedwater 112 changes over time in order to effectively and consistently treat scale-forming ions in the feedwater 112.

At the risk of being repetitive, the inventors discovered that the impedance of the probe 201 may be affected by the conductivity of the feedwater flowing through the probe 201. That is to say, over time, as the amount and type of precipitants in the feedwater 112 changes, so too may the feedwater's conductivity. As the conductivity of the feedwater 112 changes, this affects the effective voltage being applied to the feedwater 112 which directly affects the impedance of the probe 201. The variation in the probe's 201 impedance variation results in a mismatch between the generator's 202 output impedance and the probe's 201 impedance.

In more detail, when the impedance of an inventive probe, such as probe 201, is different from that of a connected generator, such as generator 202, and transmission medium (e.g., conductive cables 105,106) a "mismatch" is said to exist. When this occurs, some of the RF energy sent from the generator 202 to the probe 201 may be reflected by the probe 201, back down the transmission line(s) 105, 106, and into the generator 202. If the so reflected energy is strong enough, it can prevent the generator 202 from operating correctly, and possibly ruin the generator 202. Further, mismatched impedances adversely affect the ability of the inventive probes to effectively treat unwanted material (e.g., precipitated scale) in feedwater 112 because such mismatched impedances are believed to cause the amplitude of the electromagnetic fields applied to the feedwater 112 to vary. Such variations in the amplitude of the electromagnetic fields (i.e., both electric and magnetic fields) result in a decrease in the fields and their corresponding forces that are applied to unwanted material, such as precipitated scale in the feedwater 112, as explained elsewhere herein.

In contrast, when the generator 202, transmission mediums 105, 106 and probe 201 are connected, and each has the same impedance, the three components are said to be impedance "matched". When so matched, the amount of reflected RF energy may be minimized thus allowing a maximum amount of RF energy to be transferred from the generator 202 to the probe 201. Yet further, matched components insure a constant amplitude of the electric and magnetic fields that result in optimum forces being applied to unwanted material in the feedwater 112.

Figure 5:
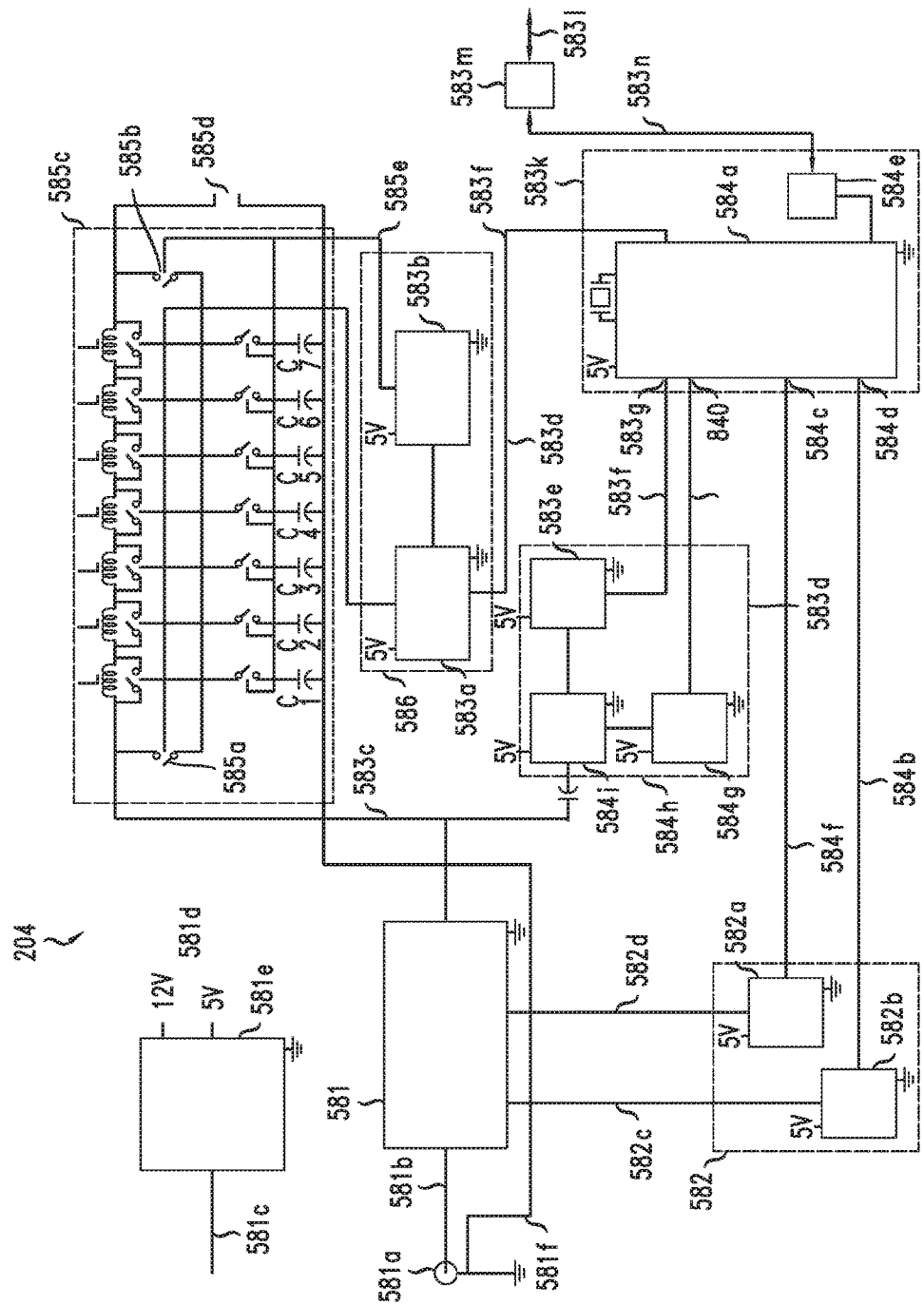
FIG. 5 depicts an exemplary impedance matching system according to an embodiment of the invention.

To eliminate the issue of mismatched impedances (i.e., to match impedances), the present inventors provide an impedance matching system, such as exemplary system 204 depicted in FIG. 5 that insures elements are impedance matched (e.g., generator, connecting cables, and probe, etc.,). System 204 or one or more of the elements of system 204 may comprise impedance matching circuitry.

Generally speaking, impedance matching circuitry according to embodiments of the invention may be operable to maintain an impedance of a representative electrical circuit including a probe 201, signal generator 202 and transmission mediums 105, 106 connecting the probe 201 and generator 202 at a matched impedance and maintain a constant amplitude of an electric field and a magnetic field.

In more detail, the ratio of forward RF energy (power) to reflected RF energy (power) is known as voltage standing wave ratio, or "VSWR" for short. VSWR is an important parameter used to calculate the amount of RF energy that may be transferred to a probe 201 and the amount of reflected energy that the probe 201 does not receive. VSWR is typically the most important parameter for matching the impedance of a generator 202, transmission mediums 105, 106 and probe 201. For example, a VSWR of 1.0:1 indicates a perfect match. As more energy is reflected, the VSWR may (undesirably) increase to 2.0:1, 3.0:1, or higher.

In one embodiment, a VSWR of 1.5:1 or less may be most effective in the treatment of feedwater 112 that contains scale forming ions (precipitated scale). Furthermore, a VSWR of 1.5:1 or less may prolong a generator's mean time between failures (MTBF) and make it more energy efficient.

In addition to impedance matching circuitry, the system 204 may include a control device 584 (e.g., microcontroller, microprocessor, or controller collectively "controller" for short). The controller 584 may be a separate controller or may be one and the same as controller 104 shown in FIG. 1. In an embodiment, the controller 584 may be connected to the positive and negative terminals of the electromagnetic field section 100B (i.e., to electrodes 303*c, d* and coils 303*e, f*) of the probe 201 that may have a fixed impedance of 50 Ohms, for example. To achieve and maintain a VSWR of 1.5:1 or less, the controller 584 may be operable to automatically measure both the forward RF energy/power (F) and reflected RF energy/power (R), respectively. From such measurements, the controller 84 may be operable to compute a VSWR based on the following relationship:

$$VSWR = (1+\sqrt{(R/F)})/(1-\sqrt{(R/F)})$$

The controller 584 may be operable to store the computed VSWR values as so-called "look up tables" in onboard memory or in associated memory (not shown in FIG. 5). Upon computing a VSWR value, the controller 584 may be further operable to account for the effects of a given probe's reactance by controlling an impedance tuning section 585c to select (e.g., adding, subtracting) an appropriate capacitance to cancel out an inductive reactance, and/or select an appropriate inductance to cancel out capacitive reactance.

System 204 may also include an exemplary directional coupling section 581 that is operable to receive an RF signal from the generator 202 and provide forward and reflected power to two exemplary RF power sensors 582a, 582b. RF power sensors 582a, 582b may be operable to provide signals representative of both forward and reverse power linear voltages to the controller 584 via analog-to-digital converter inputs of the controller 584 from which the controller 584 can compute a VSWR based on the forward and reflected voltages.

The impedance tuning section 585c may comprise one or more (typically more) printed circuit board dielectrics (polyimides, epoxy glasses, alumina ceramics, or silicon dioxide) to create banks of fixed distributed transmission line network capacitors and inductors. The banks include fixed distributed network capacitors $C_1$ to $C_n$ and fixed distributed network inductors $L_1$ to $L_n$ (where "n" denotes the last capacitor or inductor in a bank). A tuning section may be formed using MOSFET shift registers 583a, 583b and/or high frequency microwave switches 585a, 585b. The controller 584 may be operable to configure the tuning section 585c by, for example, selecting a combination of capacitors and inductors and selecting either the low impedance or the high impedance high frequency microwave switch 585a, 585b, respectively, to achieve an appropriate VSWR (e.g., low or lowest VSWR).

A signal output from the directional coupling section 583c may be sent to a power limiting section 583d that is operable to reduce the power of the signal, convert the signal to a square wave and feed the so converted signal to a divide by 256-frequency counter 583e. The signal output from counter 583f may be sent to a digital input port 583g of the controller 584.

As mentioned before the impedance matching circuitry 580 may be designed to adjust the inductive and/or capacitive reactance components of the probe 201 (e.g., cancel each other out) so that the only remaining portion of the probe's impedance, (Z), is the 50-ohm resistive component. In more detail, upon determination of the VSWR values the controller 584 may be operable to send signals to the tuning section 585c to select a combination of capacitors and inductors to achieve an appropriate VSWR (e.g., low or lowest VSWR) to cancel the appropriate inductive and/or capacitive reactance of the probe 201 so that only a 50-ohm resistive load is applied to the generator 202. In an embodiment, the system 204 may be operable to maintain a 50-ohm input impedance of a representative, equivalent electrical circuit comprised of the probe 201, generator 202 and conductors 105, 106 over a range of operating frequencies.

In embodiments, by continually adjusting the inductive and capacitive components of the electrical circuit that includes the generator 202, conductors 105,106 and probe 201 as the conductivity of the feedwater 112 changes, the system 204 insures that an applied signal at a constant, maximum power (forward power) for a given ionic cyclotron frequency corresponding to the unwanted material (scale) is consistently supplied to the probe 201 from the generator 202, while at the same time insuring that a minimum amount of reflected power is applied (reflected back at) the generator 202. Thereafter, the inventors discovered that when the forward power is consistently held at a maximum, and the reflected power is consistently held at a minimum, the probe 201 consistently applies an electromagnetic field at a given ionic cyclotron frequency corresponding to the unwanted material having a low VSWR and maximized electromagnetic field strength to the unwanted material in the feedwater 112. Because of this, the applied electric and magnetic fields create optimum Lorentz type forces that are in turn applied to the unwanted material in the feedwater 112 in order to affect the morphology of the unwanted material. More particularly, the inventors discovered that the application of such an electromagnetic field(s) and their related forces to the unwanted material in the feedwater 112 sufficiently agitates such material and interferes with (e.g., weakens) the chemical bonds that hold such unwanted material together, leading to the optimum treatment of such material (e.g., precipitated scale, such as calcium carbonate ($CaCO_3$). For example, such applied electromagnetic field affects the morphology of the scale (e.g., it keeps the scale from forming into hard, crystalline structures).

Referring back to FIG. 5, the system 204 may further comprise an exemplary "wake-up" signal generating section 584b. Section 585c may be operable to place the controller 584 in a "sleep" mode when the controller 584 is not required to compute a VSWR (e.g., when a previously computed VSWR stored in a look-up table is used), and to "awaken" the controller 584 from a sleep mode in order to prompt the controller 584 to compute a VSWR, for example.

In one embodiment of the invention, the microcontroller 584 may be operable to store specialized instructions (e.g., firmware) in a memory, where the specialized instructions may be used to configure the tuning section 585c. One such configuration may be used to, for example, minimize the number of tuning adjustments. For example, in one embodiment, the controller 584 may access stored, specialized instructions to complete coarse tuning. In such a case, the controller 584 may be operable to send a signal to deactivate the high impedance high frequency microwave switch 585a if necessary, and then control the operation of MOSFET shift registers 583a, 583b to select an individual inductor $L_1$ to $L_n$ to determine a matching impedance. Upon selection of a set of inductors $L_1$ to $L_n$, the controller 584 may then be operable to select capacitors $C_1$ to $C_n$ that are associated with a matching impedance, and compute VSWRs. If, upon making such computations, an appropriate VSWR is not computed, the controller 584 may be operable to activate the low impedance high frequency microwave switch 585b, and then repeat the selection of inductors $L_1$ to $L_n$, capacitors $C_1$ to $C_n$ and computations.

In one embodiment, upon completion of coarse tuning, the controller 584 may be further operable to complete "fine" tuning of the previously selected inductor and capacitor combinations by further selecting (or de-selecting) such inductors/capacitors, and computing VSWRs to determine whether a desired VSWR or a VSWR of 1.5:1 or lower can be obtained.

In a further embodiment of the invention, controller 584 may be operable to continuously compute VSWR values and compare such computed values to a stored reference VSWR (e.g., 1.5:1). When a comparison indicates a computed VSWR is greater than the stored reference, the controller

584 may initiate or repeat further coarse and fine-tuning sequences. Otherwise, the controller 584 may not initiate or repeat such tuning.

Plasma Section

We now turn to a discussion of the plasma section 100C of the system 1. In an embodiment, section 100C may comprise a plasma probe 102, plasma generator 101, and air compressor 117 (see FIG. 1). Probe 102 may comprise cascaded, single slot double dielectric barrier discharge (DDBD) electrodes shown in detail in FIG. 4F. In an embodiment, the probe 102 may comprise a variable number of cascaded, DDBD electrodes, alternatively, a number of cascaded, single planar Dielectric Barrier Discharge (DBD) electrodes. The number of each type of electrode that can be cascaded and contained within probe 102 may depend on the mass flow rate of the particular industrial application.

Figure 4D:
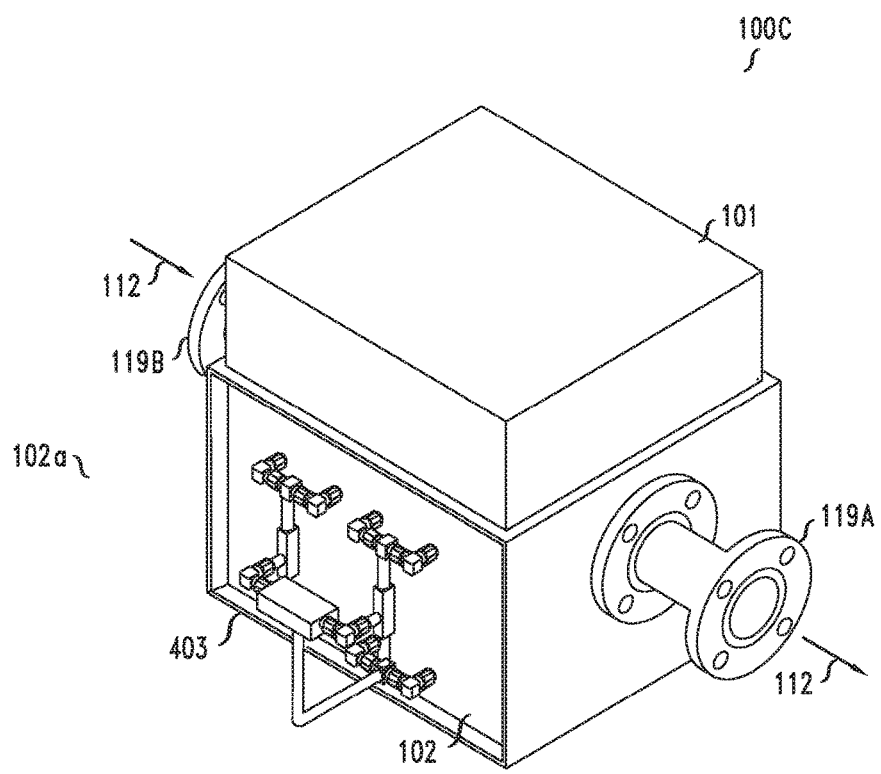
FIGS. 4D and 4E depict a plasma section according to an embodiment of the invention.
Figure 4E:
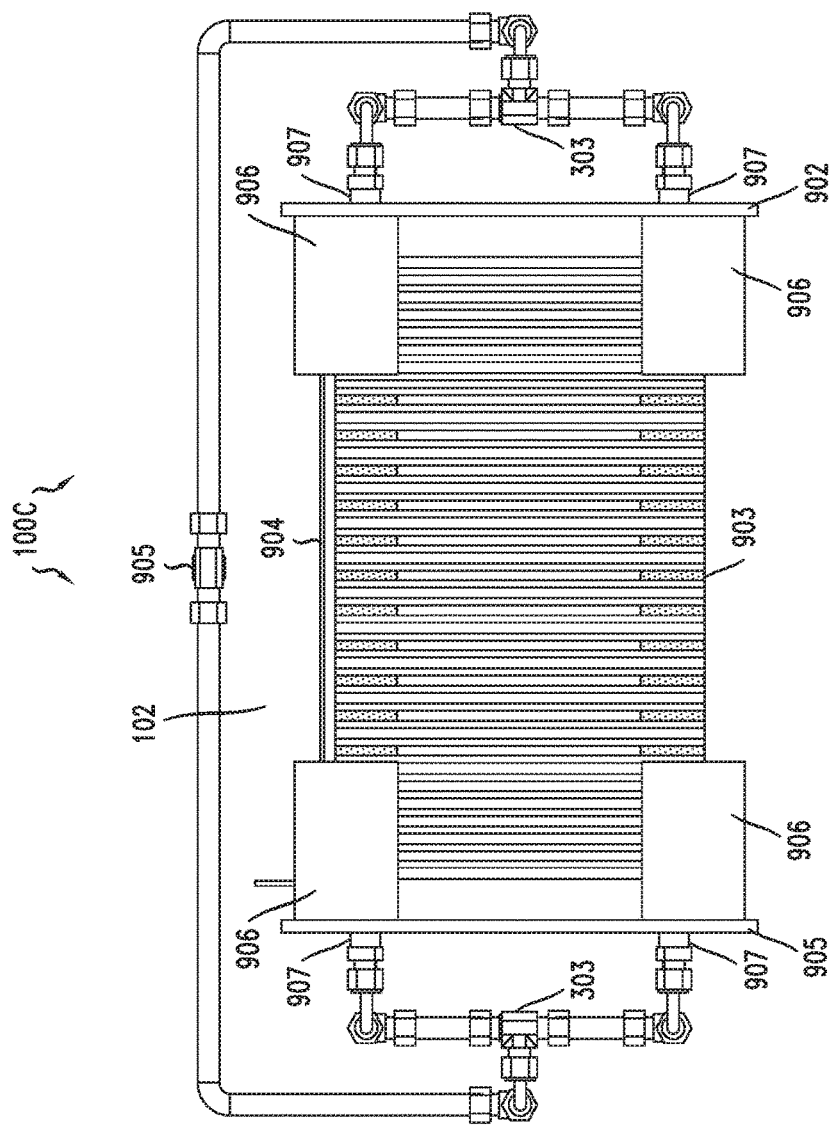

Referring now to FIGS. 4D and 4E, there is depicted more details of an embodiment of a plasma section 100C. In FIG. 4D, the plasma section 100C may comprise a probe 102, plasma generator 101, gas distribution system 403, inlet 119a and outlet 119b. It should be understood that outlet 119b may correspond to outlet 119 in FIG. 1, while inlet 119b is not shown in detail in FIG. 1 and may be substantially smaller dimension-wise.

Referring now to FIG. 4E, there is depicted a more detailed view of an exemplary probe 102 according to an embodiment of the invention. As shown, the interior of probe 102 may comprise cascaded slots 903 that include DDBD electrodes, glass filled Polyoxymethylene (commonly referred to as Delrin) spacers 906, compression fittings 907, and bus bar 904.

Referring now to FIG. 4F there is depicted exemplary sections of a DDBD probe 102. As depicted each slot 1001 may comprise at least two negative cathode electrodes 1002, Mica isolation section (e.g., sheet, plate) 1003, slotted Mica laminate fitting 1004 and a positive anode electrode 1005.

As feedwater 112 flows between the gaps (e.g., 2-millimeter gaps) between the anode electrode 1005 and each cathode electrode 1002, the feedwater 112 may be subjected to plasma energy applied by the electrode configuration. As a result, content (e.g., minerals, unwanted material) in the feedwater 112 may be ionized to form the molecules and ions used to treat and mitigate scale, biological contaminants (biofilm, *Legionella* bacteria, etc.), and biologically induced corrosion. In embodiments, the plasma energy may comprise partial and full discharges.

As understood by those skilled in the art, a type of discharge known as a streamer or filamentary discharge is a type of transient electrical discharge. Streamer discharges ("streamers" for short) can form when an insulating medium (for example air molecules in feedwater 112) is exposed to a large potential difference. For example, when the electric field created by an applied voltage from the probe 102 is sufficiently large, accelerated electrons strike air molecules in the feedwater 112 with enough energy to knock other electrons off them, ionizing them. The freed electrons go on to strike more molecules in a chain reaction. These electron avalanches (i.e., Townsend discharges) create ionized, electrically conductive regions in the air near an electrode creating the electric field. The space charge created by the electron avalanches gives rise to an additional electric field. This field can enhance the growth of new avalanches in a particular direction, allowing the ionized region to grow quickly in that direction, forming a finger-like discharge—a streamer.

Streamers are transient (exist only for a short time) and filamentary, which makes them different from corona discharges.

As used herein the phrase "streamer" may be used synonymously with the phrase "partial discharge" to distinguish such discharges from full discharges.

The application of plasma energy to the feedwater 112 in the gaps between an anode 1005 and each cathode 1002 electrode may first cause a streamer and then an arc to form in the feedwater 112. That is to say, an ionized path created by streamers may be are heated by a large current, thus forming an arc. To prevent such arcs (i.e., arcing across slots), the Mica fitting 1004 is included that functions to separate each slot from one another. Further, additional spacers 906 may be included in the probe 102 that function to electrically isolate the cascaded slots from the outer housing (see FIG. 4E).

In an embodiment, the gas distribution system 403 may inject air on the top and bottom of each slot through the Mica fitting 1004. The introduction of compressed air functions to increase ozone generation in the feedwater 112.

Referring now to FIGS. 4H and 4I, there are depicted exemplary anode and cathode electrodes 1005, 1002. In embodiments, the electrodes may either be non-porous or comprise porous, aluminum oxide plasma sprayed stainless steel 316L plates. When plain electrodes are used, the electrodes may be coated to increase their conductivity, and to decrease the voltage necessary to generate streamers in the feed water.

In one embodiment the electrodes (anode 1005 and cathode 1002) may comprise planar electrodes made from a 316L stainless steel. An exemplary anode electrode may have the dimensions of 280 mm by 180 mm by 1 mm thickness and may be coated with a 5-micron Aluminum Oxide $AL_2O_3$ layer that has a 5% porosity, a permittivity ($\varepsilon_r$) of 8-10, and conductivity ($\sigma$) of 2 µS/cm. Exemplary cathode electrodes may have dimensions of 280 mm by 180 mm and may be laminated with 280 mm by 180 mm by 1 mm thickness (length versus width versus thickness) Mica sheets, such as sheets 1003. The Mica sheets 1003 may be configured to function as dielectric barriers and may have a permittivity ($\varepsilon_r$) of 8-10.

Referring now to FIG. 4G there is depicted alternative electrode configurations according to embodiments of the invention. As shown, one configuration (labelled "VAR A") may comprise a DDBD electrode with Mica sheets 1003 between the anode 1005 and cathode electrodes 1002, as well as a porous plasma sprayed anode plate 1005. Another configuration (labelled "VAR B") may comprise a DBD electrode with porous plasma sprayed cathode electrodes 1005, and a non-porous stainless steel 316L anode electrode 1002, while yet a third configuration ("VAR C") comprises a DBD electrode with a Mica sheets 1003 adjacent a non-porous anode electrode 1002 and a non-porous stainless steel 316L cathode electrode 1002.

The output voltage supplied by the plasma generator 101 to the electrodes 1002,1005 may be used by the electrodes 1002, 1005 to generate extremely high electric field strengths (E) in the order of 150 kV/cm at atmospheric pressure with electron densities between $10^{14}/cm^3$ and $10^{15}/cm^3$, and a current density, J, between 75 $A/cm^2$ and 225 $A/cm^2$, where the current density is based on the product of the electric field strength and the complex conductivity ($\alpha$) of the feedwater and Mica fittings 1004, namely:

$$J = \sigma E \quad (17)$$

In embodiments, the generation of electric fields with such high electric field strengths creates the before-mentioned streamers in the gaps between an anode and its adjacent or corresponding cathode electrodes.

As noted previously, electrodes may be coated or otherwise include either a layer (i.e., sheet) of aluminum oxide or Mica laminate on their surface. In embodiments, either type of layer may function to redistribute an electric field during a plasma energy pre-discharge phase. In addition, in embodiments where the relative permittivity and conductivity of the feedwater 112 in the gap between two dielectrics is decreased, the electric field strength on the surfaces of the electrodes may increase. Increasing the electric field strength produces larger amounts of streamers which results in improved rotational and vibrational excitation, electron avalanche, dissociation, and ionization processes.

Plasma Generator

Figure 6:
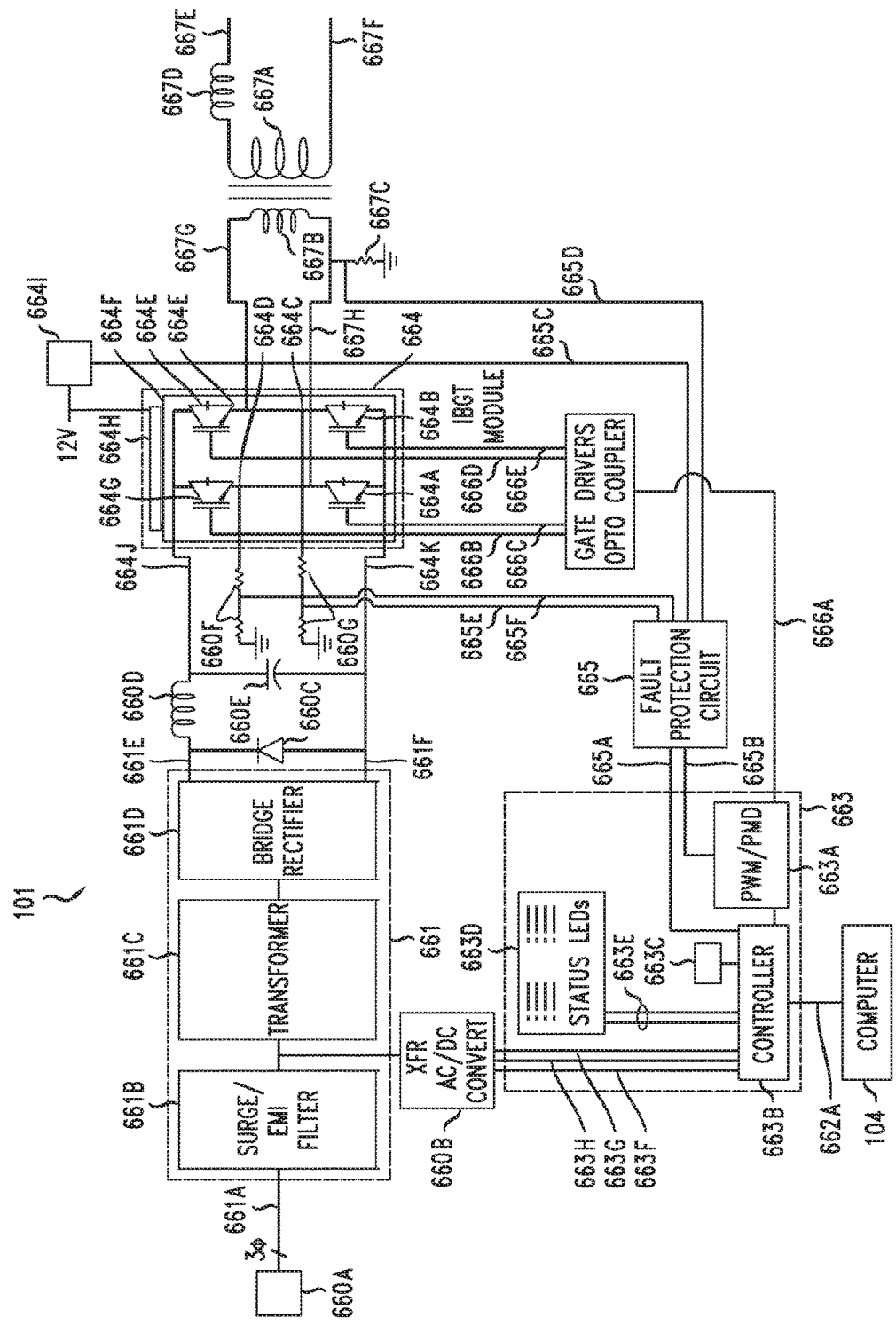
FIG. 6 depicts an exemplary block diagram of a plasma generator according to one embodiment of the invention.

Referring now to FIG. 6 there is depicted an exemplary block diagram of a plasma generator 101 according to one embodiment. In an embodiment, the plasma generator 101 may comprise a 10 kW a unipolar/bipolar device with an automatic operating pulse density modulation (PDM) frequency range from 1 kHz to 30 kHz. Further, the plasma generator 101 may be operable to tune an output frequency to maximize the peak voltage and maintain the breakdown voltage in the plasma discharges it generates in the feedwater 112. The plasma generator 101 may be connected to a 208 VAC 3-phase electrical utility source 660a via a 3-phase electrical power cable 661a and operable to produce signals having a 30 kV output voltage and a 0.167 A current, for example, in order to supply the plasma probe 102 with the energy required to allow the probe 102 to produce high-energy electric fields (electrohydraulic discharges) in the feedwater 112. The plasma generator 101 may be configured such that it is installed in an electronic housing unit of the plasma probe 102 (see FIG. 4D) to supply power to the electrodes of the plasma probe 102. It should be understood that by configuring the generator 101 in the housing, the generator 101 may be connected to the probe 102 using short (dimension-wise) connections. This configuration aids in insuring that those users of the system 1 are not exposed to the high voltages produced by the plasma generator 101 and makes the supply of energy to the probe more efficient (i.e., the shorter the physical connection, the less energy is lost through the connecting cables, wires, etc.).

In an embodiment, as described further below, the plasma generator 101 may include the following sub-circuitries, circuitry, and/or modules: AC to DC bus-bar voltage/current circuitry 667d, IGBT (Insulated Gate Bipolar Transistor) module 664g, microcontroller 663b (which may be separate from, or the same as controller 104 in FIG. 1), status LEDs 663d, pulse width modulator/pulse density modulator 663a, gate driver opto-couplers 666, fault detection circuit 665, AC-to-DC low voltage converters 660b, and thermal management circuitry 664h.

AC to DC Bus-bar Voltage/Current Circuitry

In an embodiment, an AC to DC power supply module 667d circuit may be operable and configured to accept 3-phase AC power at an input receptacle 660a. An AC power surge filter module 661b with a metal oxide varistor (MOV) may be connected in parallel between the 3-phase 208 VAC power line conductors 661a and function to protect the plasma generator 101 from electric power utility surge, voltage dips, variations, and brownout conditions. Module 661b may further contain an EMI filter that functions to reduce conducted emissions produced by the plasma generator 101 on the 3-phase AC power line conductors. The 3-phase 208 VAC AC voltage via lines 661a may be stepped down from power utilities by transformer 661c and rectified by a 3-phase AC bridge rectifier 661d to produce a 240V peak DC bus voltage and a 41.7 A peak DC bus current. The DC bus bar voltage may be stabilized by Zener diode 660c and filtered by inductor 660d and capacitor 660e. The DC bus voltage may be used to power the IGBT module 664. The plasma generator 101 may contain current limiters to limit inrush current during the start-up and normal operating conditions of the plasma generator 101.

IGBT (Insulated Gate Bipolar Transistor) Module

In an embodiment, an IGBT module 664 may comprise a full-bridge IGBT circuit consisting of two upper and two lower Insulated Gate Bipolar Transistors (IGBTs) switches connected in a cascade arrangement. The IGBT module 664 may have 5-terminal circuit s which include a DC bus voltage input 664j, two mid-points between the four switches 664d and 664c, a ground return 664k, two low-side gate drives input 666c, 666c and two high-side gate drives input 666b, 666d. The diagonal pairs of IGBT switches (664g, 664b, 664g or 664e) may conduct alternately, thus, achieving current reversal in the transformer's 667b primary side. The output of the IGBT module 664 may directly connect to the input 667b of the pulse transformer 667g.

Low Voltage AC-to-DC Circuitry

The AC-to-DC circuit 660b may comprise a stepdown transformer, an AC to DC rectifier, six DC-to-DC converters necessary to generate +15V/1.5 A; 63h, −15V/1.5 A; 63h, +12/5 A; 663f, −12V/5 A; 663f, +5V/1.5 A; 663g, and −5V/1.5 A; 663g for supplying power to subsystem circuitries of the plasma generator 101, for example.

Thermal Management Circuitry

In an embodiment, the IGBT module 664 may be mounted on a heat sink 664h that comprises one or more fans to exhaust heat from the IGBT module 664. A microcontroller 663b may be operable to control (e.g., shut down) electrical power to the plasma generator 101 in order to protect the generator 101 from thermal damage by, for example, sending high-temperature lockout signals to the generator 101. A 5 kΩ negative coefficient thermistor (temperature sensor) may function as a thermal sensor and may be mounted on a preamplifier and IGBT heat sink 664h. Two comparators in the fan may be operable to monitor the temperature of the temperature sensors. Signals from the comparators may be sent to the microcontroller 663b where the microcontroller 663b converts the signals to a temperature and compares the temperature to a stored reference. In an embodiment, one or more temperatures for turning the fans on or off (i.e., controlling the fans) may be may be stored in the microcontroller 663b for the fans to perform their function. In more detail, the first comparator may be operable to send signals that control the operation of the fans by, for example, turning the fans on whenever the temperature at the temperature sensor rises to about 110° F. and turning the fans off when the temperature drops about 5 degrees, for example. Each fan may comprise resistance circuitry (e.g., a resistor) that is operable to generate a signal representative of a small differential in temperature that functions to allow enough heat to be drawn away from the heat sink 664f so that the fans will not stutter on and off as the heat stored in the heat sink 664f core begins to be detected by the sensor mounted on a surface of the heat sink 664h.

Fault Protection Circuitry

The fault protection circuitry may be operable to disable the drive signals 666b, 666c, 666d, 666e to the IGBT switches 664g, 664a, 664e, and 664b should the output voltage signals 660*f* and 660*g* at mid points 664*d* and 664*c* or the load current through the full bridge exceed preset reference values. Resistors 660*f*, and 660*g* respectively may function to measure over protection voltage signals. Resistor 667*c* may function to determine an over current signal based on a voltage drop across the resistor 667*c*. A fault protection logic module 665 may consist of two high speed comparators.

Microcontroller, Pulse Width Modulation, and Status LED Circuitry

Figure 7:
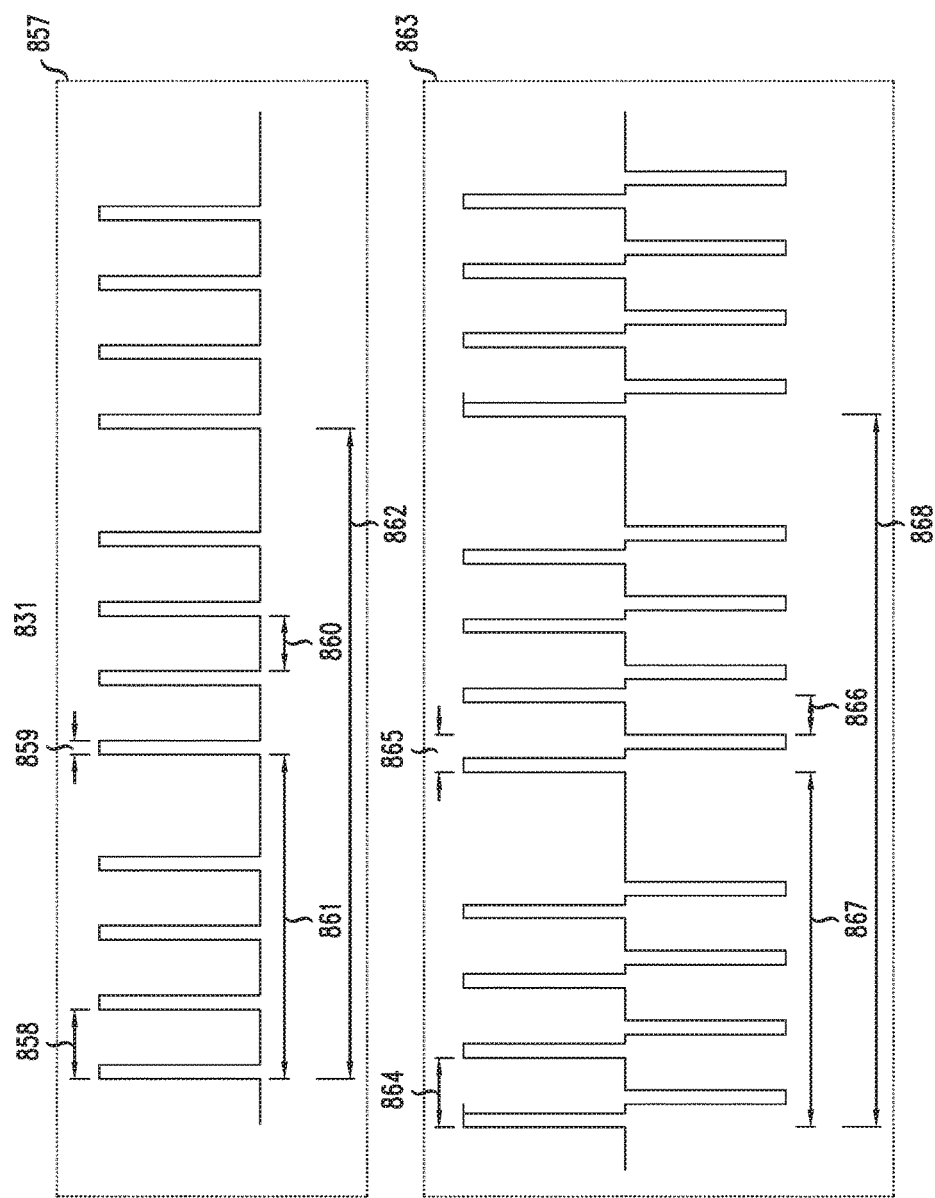
FIG. 7 depicts exemplary signals generated by an exemplary pulse width modulation/pulse density modulation (PWM/PDM) according to one embodiment of the invention.

In an embodiment, the plasma section 100C may comprise digital circuitry 663 which comprises a microcontroller 663*b* with two serial peripheral interface ports, 663*e*, and onboard memory 663*c*. The circuitry 663 may further comprise a serial peripheral interface (SPI) having ports and a Universal Serial Bus (USB) having a port 662*a* that function to interface with a special purpose computer 104 (i.e., a computer that executes specialized instructions stored as electrical signals). Still further, the circuitry 663 may comprise a pulse width modulation/pulse density modulation (PWM/PDM) section 663*a* (e.g., circuitry) that is operable to (functions to) adjust the concentration of chlorine by auto tuning, e.g., by generating signals 665*b* and 666*a* to control the value of unipolar/bipolar pulse signals. For example, referring to FIG. 7, the signals may control the time the pulse signals are turned on or off (e.g., on-time pulses 859 and 865 and off-time pulses 860 and 866), set a pulse period 858 and 864 of the unipolar/bipolar pulse signals, set a duty cycle 861 and 867 of the unipolar/bipolar pulse wave signals and set the PDM duty cycle 862 and 868 of the unipolar/bipolar pulse wave signals. In an embodiment, an overall on-time of a square wave, unipolar pulse wave signal 666*a* may be established by the combination of the pulse width duty cycle and the duty cycle of the PDM.

In embodiments, the operating frequencies of such a square wave signal 666*a* may be from 1 kHz to 30 kHz. The PWM/PDM section 663*a* may be connected to an optocoupler 666 that functions to control the operation of IGBT switches 664*g*, 664*a*, 664*e* and 664*b* by outputting signals 666*b*, 666*c*, 666*d*, and 666*e* to the IGBT switches 664*g*, 664*a*, 664*e*, and 664*b*. The microcontroller 663*b* may be operable to automatically tune (auto-tune) the operating frequency of the plasma generator 101 by measuring the current from the voltage drop across resistor 667*c*, and automatically changing the PWM/PDM section's 663*a* operating frequency and duty cycle to identify and select a resonant frequency of a plasma probe, such as probe 102. As a result, the plasma generator 101 may be operable to supply the probe 102 with a signal that represents an electric field having high field strength while using less electrical energy than existing techniques. It should be further understood that the auto tuning described herein provides the system 1 with the ability to efficiently produce mixed oxidants by maintaining a resonant frequency. In more detail, as explained previously the conductivity of the feedwater 112 may change over time. Realizing this, in an embodiment the microcontroller 663*b* and components of circuitry 663 may be operable to change on and off times (duty cycle) to make sure a resonant frequency is maintained. Thus, for example, if the amount of salt in the feedwater 112 changes, the system 1 may create the same amount of mixed oxidants.

In an embodiment, the digital circuitry 663 may further comprise monitoring status LED 663*d* circuits that function to monitor the following; system faults, IGBT faults, high side temperature, hot load, power (high and low), locked system, load fault and inverter switched on.

High Voltage Output Pulse Transformer and Tesla Load Tuning Coil

In an embodiment, the plasma section 100C may incorporate a pulse transformer 667*g* which may comprise a step-up transformer that functions to produce 5 kVA of power with an input voltage of 240 V, an input current of 41.7 A, an output voltage of 30 kV, and an output current of 0.33 A, for example. An IGBT switch 664 may function to turn the power to the pulse transformer 667*g* ion and off at 1 kHz to 30 kHz operating frequency, for example, and a PDM duration provided by the PWM/PDM section 663*a* (e.g., circuitry) in order to deliver constant power from the plasma generator 101 via output port 667*a* to the plasma probe 102. A Tesla tuning coil 667*d* may function to control the resonant frequency range of the plasma probe 102 so that a dielectric barrier discharge resonance may be achieved that, in turn, maximizes the peak output voltage of the plasma generator 101 to achieve a voltage required to generate plasma discharges in the feedwater 112.

The pulse transformer 667*g* may operate in a unipolar or bipolar pulse mode. In the bipolar pulse mode, transformer 667*g* may generate magnetic field lines from its core that alternate between positive and negative values (e.g., magnetic field lines cross from positive values, to zero, to negative values). Such an operation reduces the transformer's 667*g* heat and core losses. In the unipolar mode, the pulse transformer's internal bias coil that is connected to a fixed direct current functions to create biasing magnetic field lines, which forces the magnetic field lines to cross zero to reduce core losses and heat.

Having presented the structure and function of some embodiments of the invention, we now turn to a discussion of the operation of such embodiments. In particular we now discuss how embodiments of the invention form plasma energy discharges in feedwater 112 that may be used to treat, minimize and destroy bacteria, among other functions.

During discharge, feedwater 112 in between two electrodes of the plasma section 100C instantly evaporates and undergoes thermal breakdown upon application of plasma energy from the electrodes. The application of the plasma energy causes a discharge to form between the electrodes due to the large amount of (heat) energy from the electrical current of the applied fields. It should be understood that if the amount of heat energy delivered to the feedwater 112 is lower than a threshold, for the most part, only electrolysis will occur. Accordingly, in embodiments of the invention the plasma probe 102 may be operable to generate fields that exceed such a threshold of the feedwater 112 in order to form streamers. In embodiments, the application of the plasma energy to the feedwater 112 functions to produce a plurality of streamers in the feedwater 112. The streamers in turn function to initiate the energizing of electrons and the creation of, or buildup of, an electrical charge (i.e., space charge accumulation) in the feedwater 112. In embodiments, this produces reactive (ionic and excited atomic) and molecular species in the feedwater 112. These reactive and molecular species are characterized and created by electron avalanche, rotational and gravitational excitation, dissociation, and ionization processes with energies up to 20 electron Volt (eV).

Specifically, rotational and vibrational excitation of reactive and molecular species in feedwater 112 may typically occur below a 1 eV energy threshold while electron avalanche occurs between a 5 eV to 20 eV energy threshold and produces various charged particles (electrons, positive ions, negative ions, complex ions, etc.). Disassociation of reactive and molecular species in feedwater 112 may occur in the energy band between 8 eV and 9 eV, while ionization of the feedwater 112 may occur around a threshold of approximately 13-14 eV.

In embodiments, determining the required applied voltage needed to produce streamers in feedwater 112 involves an understanding of the thermal breakdown instability, $\Omega$, of the feedwater 112 due to joule heating. The thermal breakdown instability can be expressed as $$\Omega = \left(\frac{\sigma_0 E^2}{\rho C_p T_0}\right)\frac{E_a}{RT_0} - D\frac{k}{R_0^2} \qquad (18)$$

where ($R_0$) is the radius of the breakdown channel, (D) is the thermal diffusivity of water (1.5e-7) m$^2$/s, ($C_p$) is the specific heat constant of water (4179 K/kg*K), and (k) is the thermal conductivity of water (0.6 W/mK). The first term represents the heating element, where the numerator represents heat energy and the denominator represents heat stored in the water. In this first term, the value, $E_a/RT_0$, represents the ratio of the activation energy, $E_a$, to the temperature. The second term, $$D\frac{k}{R_0^2},$$

represents the ratio of thermal diffusivity to the square characteristic length of the radius of the breakdown channel for radial heat conduction. Typically, when the thermal breakdown instability is greater than 0, thermal explosion in feedwater 112 may occur, which in turn creates discharges in the feedwater 112. Using that phenomenon, the equation above can be reconstructed as:

$$\left(\frac{\sigma_0 E^2}{\rho C_p T_0}\right)\frac{E_a}{RT_0} \geq D\frac{k}{R_0^2} \qquad (19)$$

In the generation of different reactive and molecular species, there are instances where full discharges will occur. When that is the case, the following equations (e.g., Equation 21) may be used to calculate the breakdown voltage of the channel. In more detail, the breakdown voltage of feedwater 112 can be determined from the product of the electric field strength (E) of an applied electrical field, and the distance (L) between two electrodes, we introduce a geometric factor, $G=L/R_0$, into Equation 19. Thus, Equation 19 can be rewritten as:

$$\left(\frac{\sigma V^2}{\rho C_p T_0}\right)\frac{E_a}{RT_0} \geq DkG^2 \qquad (20)$$

From this equation the breakdown voltage, V, can be determined using $$V \geq \sqrt{\frac{kRT_0^2}{\sigma_0 E_a}} G \qquad (21)$$

In an embodiment, if the total gap distance (i.e., spacing) between electrodes in each slot of an exemplary probe 102 is 4 mm, and the radius of a streamer is typically on the order of 4 μm, an exemplary breakdown voltage in feedwater 112 required to form a full discharge may be estimated to be:

$$V \geq \sqrt{\frac{kRT_0^2}{\sigma_0 E_a}} G = \qquad (22)$$

$$\sqrt{\frac{0.613 * 461.5 * (300)^2}{0.1 * 700{,}000}} G \cong 28.4 * \left(\frac{4000}{4}\right) \cong 28{,}400 \text{ V}$$

$$V \geq 28{,}400 \text{ V}$$

In sum, an exemplary voltage of at least 28,400 V between electrodes of a plasma probe 102 would be needed to breakdown feedwater 112 at 300 K with a gap of 4 mm to create a full plasma discharge. In embodiments, as the conductivity of the feedwater 112 increases, it is expected that the minimum breakdown voltage would decrease. In yet another embodiment, an exemplary voltage of at least 18,000 V between electrodes of a plasma probe 102 would be needed to breakdown water at 300 K with a gap of 3 mm to create a full plasma discharge.

Rotational and vibrational excitation, electron avalanche, dissociation, and ionization processes that occur in the feedwater 112 due to the generation of streamers may further initiate chemical reactions that result in the formation, or creation, of hydroxyl radicals (OH.), hydrogen (H$^+$), hydrogen gas (H$_2$), atomic oxygen radicals (O.), hydrogen peroxide (H$_2$O$_2$), hydronium (H$_3$O$^+$), super oxide anion (.O2$^-$), singlet oxygen ($^1$O$_2$) ions, ozone (O$_3$), hypochlorous acid (HClO), chlorate (ClO$_3^-$), and ultra-violet light.

Having presented a discussion of some exemplary, novel systems and related methods that function to generate novel plasma energy in feedwater 112, we turn to a discussion of some exemplary applications of the so-generated plasma energy in feedwater 112. In particular, we present some exemplary electrochemical mechanisms which may be triggered, initiated and completed in feedwater 112 upon the application of the novel plasma energy discharges by the novel systems and methods of the present invention (e.g., probe 102) to treat scale, biological contaminants, (Biofilm, *Legionella* bacteria, etc.), and biologically induced corrosion.

As discussed previously, scale formation may occur when highly soluble and naturally occurring ions in feedwater 112 precipitates into an insoluble form due to temperature, pressure and/or pH changes in the feedwater 112. For example, calcium ions (Ca$^{2+}$) and bicarbonate (HCO$_3^-$) ions precipitate into calcium carbonate (CaCO$_3$) and carbon dioxide (CO$_2$) gas. Other examples of scale forming ions are magnesium and strontium ions. Thus, we first discuss mechanisms that may mitigate scale.

Mechanism 1, the Treatment of Scale Through Hydrogen Ion Generation

In an embodiment, an exemplary plasma section 100C may be operable, and function, to apply the plasma energy (e.g., streamers) to the feedwater 112 and to produce hydrogen ions in the feedwater 112 to treat scale in feedwater 112 (i.e., to effect the morphology of scale forming ions in the feedwater) by initiating the ionization of oxygen in the feedwater 112 that produces the hydrogen ions. The presence of hydrogen ions reduces bicarbonate ions which are required for scale formation. From Equation 23.1 below, it can be seen that excited molecular species in the feedwater 112 react with the hydrogen and oxygen to form Oxoniumyl ($H_2O^+$). Oxoniumyl ($H_2O^+$) further reacts with the minerals to produce Hydronium ($H_3O^+$) and the Hydroxyl radical (OH.) (as illustrated by in Equation 23.2 below).

In more detail, hydrogen ($H^+$) ions may be produced by direct ionization of the feedwater 112 as a result of the generation and formation of streamers in the feedwater 112. The $H^+$ ions may react with bicarbonate ions ($HCO_3^-$) present in the feedwater 112 to produce additional water molecules ($H_2O$) and carbon dioxide gas ($CO_2$) shown in equation 23.3 below.

$$H_2O^* + H_2O \rightarrow H_2O^* + OH. \qquad (23.1)$$

$$H_2O^* + H_2O \rightarrow H_3O^* + OH. \qquad (23.2)$$

$$H^+ + HCO_3^- \rightarrow H_2O^* + CO_2\uparrow \qquad (23.3)$$

Thus, in embodiments of the invention, exemplary probes, such as probe 102, provided by the present invention may reduce the propensity for scale to form on heat exchanger elements and the inside of pipe walls by removing bicarbonate ions from the feedwater 112.

Mechanism 2, the Treatment of Scale Through Nitric Oxide Generation

Relatedly, in an embodiment an exemplary plasma section 100C may be operable to apply the plasma energy (e.g., streamers) to the feedwater 112 and to produce hydrogen in the feedwater 112 to treat scale (i.e., to effect the morphology of scale forming ions in the feedwater) by the ionization of feedwater 112 which results in the formation of hydrogen through the disassociation of nitric acid ($HNO_3$) into hydrogen ($H^+$) ions and nitrate ($NO_3^-$) ions. For example, as a carrier gas (e.g., atmospheric gases, compressed air or oxygen, $O_2$) enters through the gas distribution system 403 (see FIG. 4A) the gas comes in contact with feedwater 112 which causes molecules in the feedwater 112 to ionize and disassociate into molecular nitrogen gas ($N_2$) gas and molecular oxygen gas ($O_2$) gas. Both the molecular nitrogen gas and molecular oxygen gas may further react with nitrogen and oxygen atoms to produce nitric oxide gas (NOx) (see Equation 24.1 below). The oxygen atoms from the carrier gas oxidizes nitrate ($NO_x$) to form nitrogen dioxide ($NO_2$). The nitrogen dioxide ($NO_2$) in the feedwater 112 results in nitric acid ($HNO_3$) production. Upon generation of the streamers in the feedwater 112 hydrogen ions are produced from the nitric acid (see Equation 24.2 below).

$$N_2 + O_2 \xrightarrow{Plasma} NO_x \qquad (24.1)$$

$$NO_x + H_2O \rightarrow HNO_3 \rightarrow H^+ + NO_3^- \qquad (24.2)$$

As discussed throughout the text herein, exemplary, novel systems and methods are discussed that treat (reduce, mitigate or destroy) biological contaminants, (Biofilm, *Legionella* bacteria, etc.), and biologically induced corrosion through the generation and application of plasma energy discharges (e.g., streamers) to feedwater 112 (among other types of water). We now present some exemplary electrochemical mechanisms which may be triggered, initiated and completed in feedwater 112 upon the application of such novel plasma energy discharges that leads to the treatment (reduction, mitigation or destruction) of biological contaminants, (Biofilm, *Legionella* bacteria, etc.), and biologically induced corrosion.

Mechanism 3, the Treatment of Biological Contaminants and Biologically Induced Corrosion Through Ozone Generation In an embodiment, an exemplary plasma section 100C may be operable to apply the plasma energy discharges (e.g., streamers) to the feedwater 112, and to produce ozone in the feedwater 112 in order to treat biological contaminants (Biofilm, *Legionella* bacteria, etc.) and biologically induced corrosion in feedwater 112. For example, streamers in feedwater 112 generated by an exemplary probe 102 produce ozone gas ($O_3$) through the process of electron impact dissociation of molecular oxygen ($O^2$) and molecular nitrogen ($N_2$) of a supplied carrier gas supplied by a gas distribution system 403 (again, see FIG. 4A). The system 403 may include an air compressor 117 (see FIG. 1 or 4A) and the carrier gas may be either dry air or ambient air, for example. In an embodiment, upon generation of a streamer the molecular oxygen ($O_2$) gas may react with a dissociated oxygen atom from the carrier gas to form ozone gas. The ozone gas causes reactions that lead to the reduction of biological contaminants in the feedwater 112 and further leads to the dissolution of biologically induced corrosion in the feedwater 112.

$$O_2 + e^- \rightarrow O. + e^- \qquad (25.1)$$

$$O_2 + 2O. \rightarrow O_3 \qquad (25.1)$$

Mechanism 4, the Treatment of Biological Contaminants and Biologically Induced Corrosion Through the Generation of Hydrogen Peroxide In an embodiment, an exemplary plasma section 100C may be operable to apply the plasma energy discharges (e.g., streamers) to the feedwater 112, and to produce hydrogen peroxide in the feedwater 112 to treat biological contaminants (biofilm, *Legionella* bacteria, etc.) and biologically induced corrosion in feedwater 112. For example, an exemplary plasma probe, such as probe 102, may be operable to generate streamers in the feedwater 112. The streamers produce hydrogen peroxide through electron impacts initiated by the disassociation of vibrational excited molecules, where excited feedwater molecules ($H_2O^*$) decompose (see Equation 26.1 below). The excited water molecules ($H_2O^*$) react with the (non-exited) feedwater 112 molecules ($H_2O$) to produce hydrogen ions ($H^+$), hydroxyl radicals (OH.), and additional water molecules ($H_2O$).

$$H_2O + e^- \rightarrow H_2O^* + e^- \qquad (26.1)$$

$$H_2O^* + H_2O \rightarrow H^+ + H_2O + OH. \qquad (26.2)$$

$$OH. + H_2O^* \rightarrow H^+ + H_2O_2 \qquad (26.3)$$

The reactions represented in equation 26.2 above result in the further propagation of reactions of vibrationally excited molecules (represented by Equation 26.3) to produce hydrogen peroxide $H_2O_2$.

Mechanism 5, the Treatment of Biological Contaminants and Biologically Induced Corrosion Through Mixed Oxidants Generation In an embodiment, an exemplary plasma section 100C may be operable to apply the plasma energy discharges (e.g., streamers) to the feedwater 112, and to produce chlorine reactive oxidative species in the feedwater 112 to treat (reduce) biological contaminants (biofilm, *Legionella* bacteria, etc.) and biologically induced corrosion in the feedwater 112. Upon formation of the streamers in the feedwater 112, chlorine based reactive oxidative species are created through electron impacts initiated by the disassociation of vibrational excited molecules.

In more detail, excited chloride ions ($Cl^-$) present in the feedwater 112 combine to form chlorine (see Equation 27.1 below). Thereafter, excited chloride atoms ($Cl^-$) react with the feedwater 112 molecules (H$_2$O) to produce hypochlorous acid (HClO) and hydrogen ions (H$^+$).

Hypochlorous acid and the hypochlorite anion (ClO$^-$) exist in pH dependent equilibrium (represented by Equation 27.3). Chloride is freed as a result of atomic oxygen radical (O.) releases (see Equations 27.4 and 27.5). Continued charge flow results in a two-step chlorate (ClO$_3^-$) formation (as represented in Equations 27.6 and 27.7).

$$2Cl^- \rightarrow Cl_2 + 2e^- \quad (27.1)$$

$$Cl^- + H_2O \rightarrow HClO + H^+ + e^- \quad (27.2)$$

$$HClO \leftrightarrow ClO^- + H^+ \quad (27.3)$$

$$HClO \rightarrow O. + Cl^- + H^+ \quad (27.4)$$

$$ClO^- \rightarrow O. + Cl^- \quad (27.5)$$

$$2OCl^- \rightarrow ClO_2^- + Cl^- \quad (27.6)$$

$$OCl^- + ClO_2^- \rightarrow ClO_3^- + Cl^- \quad (27.7)$$

Byproducts of the Reduction of Biological Contaminants and Biologically Induced Corrosion As indicated previously, an exemplary plasma section 100C may be operable to treat biological contaminants (biofilm, *Legionella* bacteria, etc.) and biologically induced corrosion in feedwater 112. In so doing, hydrogen gas may be created as a byproduct. In more detail, streamers in the feedwater 112 may produce hydrogen gas (H$_2$) through electron impacts initiated by the disassociation of vibrational excited molecules, where excited feedwater molecules 112 (H$_2$O*) decompose (see Equation 28). Accordingly, the exemplary system 1 may include ventilation equipment to dispose of the generated hydrogen gas.

$$2H_2O + 2e^- \rightarrow H_2 + OH^- \quad (28)$$

It should be apparent that the foregoing describes only selected embodiments of the invention. Numerous changes and modifications may be made to the embodiments disclosed herein without departing from the general spirit and scope of the invention. For example, though feedwater has been the liquid utilized in the description herein, other suitable liquids may be used. That is, the inventive devices, systems and methods described herein may be used to partially or substantially treat these other liquids as well.

What is claimed is:

1. A method for treating feedwater comprising:
    adding a brine solution into feedwater to promote the formation of reactive and molecular species in the feedwater;
    forming an amount of ionized, dissolved metal ions in feedwater;
    applying modulated electric and magnetic fields to the feedwater to effect the morphology of scale forming ions in the feedwater; and
    applying plasma energy streamers to the feedwater to form the reactive and molecular species in the feedwater.

2. The method as in claim 1 further comprising applying the plasma energy to the feedwater and producing hydrogen ions in the feedwater.

3. The method as in claim 1 further comprising applying the plasma energy to the feedwater and producing hydrogen in the feedwater.

4. The method as in claim 1 further comprising applying the plasma energy to the feedwater and producing ozone gas in the feedwater.

5. The method as in claim 1 further comprising applying the plasma energy to the feedwater and producing hydrogen peroxide in the feedwater.

6. The method as in claim 1 further comprising applying the plasma energy to the feedwater, and producing chlorine based reactive oxygen species in the feedwater.

* * * * *